INVENTORS A. E. JOEL, JR.
M. E. KROM
BY
ATTORNEY

Sept. 23, 1958  A. E. JOEL, JR., ET AL  2,853,562
SERVICE OBSERVING CIRCUIT
Filed Dec. 28, 1955  11 Sheets-Sheet 9

FIG. 10

| FOR SUBS. LINE NOS. | IN VERT. GROUP NO. | LINE UNIT 0 | 1 | 2 | 3 | 4 | 5 | TRUNK PREFERENCE |
|---|---|---|---|---|---|---|---|---|
| | | TO TRUNK NUMBER | | | | | | |
| 00-04 | 0 | 1 | 6 | 0 | 7 | 8 | 9 | 0, 1, 7, 6, 8, 9 |
| 05-09 | 1 | 3 | 4 | 0 | 7 | 8 | 9 | 4, 7, 3, 0, 8, 9 |
| 10-14 | 2 | 1 | 6 | 2 | 5 | 8 | 9 | 6, 2, 1, 5, 8, 9 |
| 15-19 | 3 | 3 | 4 | 2 | 5 | 8 | 9 | 2, 3, 5, 4, 8, 9 |
| 20-24 | 4 | 3 | 6 | 2 | 7 | 8 | 9 | 3, 6, 2, 7, 8, 9 |
| 25-29 | 5 | 0 | 5 | 2 | 7 | 8 | 9 | 7, 5, 0, 2, 8, 9 |
| 30-34 | 6 | 3 | 6 | 1 | 4 | 8 | 9 | 1, 4, 6, 3, 8, 9 |
| 35-39 | 7 | 0 | 5 | 1 | 4 | 8 | 9 | 5, 0, 4, 1, 8, 9 |
| 40-44 | 8 | 0 | 2 | 4 | 6 | 8 | 9 | 2, 0, 6, 4, 8, 9 |
| 45-49 | 9 | 5 | 7 | 4 | 6 | 8 | 9 | 4, 6, 5, 7, 8, 9 |
| 50-54 | 10 | 0 | 2 | 1 | 3 | 8 | 9 | 1, 3, 0, 2, 8, 9 |
| 55-59 | 11 | 5 | 7 | 1 | 3 | 8 | 9 | 7, 5, 3, 1, 8, 9 |

FIG. 11

| FOR VERT. GROUP NOS. | CONNECT TS0 | TS1 | TS2 | TS3 | E | F | G | H |
|---|---|---|---|---|---|---|---|---|
| | RELAY WINDING RESISTANCE TO VG-RELAY ARMATURE | | | | | | | |
| 0 | 1 | 2 | 8 | 7 | 3 | 4 | 5 | 6 |
| 1 | 5 | 8 | 4 | 7 | 2 | 3 | 1 | 6 |
| 2 | 7 | 3 | 2 | 6 | 1 | 4 | 5 | 8 |
| 3 | 3 | 4 | 6 | 5 | 1 | 2 | 7 | 8 |
| 4 | 4 | 7 | 9 | 8 | 1 | 2 | 5 | 6 |
| 5 | 8 | 6 | 1 | 3 | 2 | 4 | 5 | 7 |
| 6 | 2 | 5 | 7 | 4 | 1 | 3 | 6 | 8 |
| 7 | 6 | 1 | 5 | 2 | 3 | 4 | 7 | 8 |
| 8 | 3 | 1 | 7 | 5 | 2 | 4 | 6 | 8 |
| 9 | 5 | 7 | 6 | 8 | 1 | 2 | 3 | 4 |
| 10 | 2 | 4 | 1 | 3 | 5 | 6 | 7 | 8 |
| 11 | 8 | 6 | 4 | 2 | 1 | 3 | 5 | 7 |

FIG. 12

| VERT. GROUP | CONNECT H REL. ARMATURE 12 | 13 | 14 | 15 | 16 | 17 | 18 | 19 | C0 | C1 | C2 | C3 | C4 | C5 | C6 | C7 |
|---|---|---|---|---|---|---|---|---|---|---|---|---|---|---|---|---|
| | TO VG-RELAY ARMATURE | | | | | | | | | | | | | | | |
| 0 | 9 | 10 | – | – | – | – | 12 | 11 | 14 | 15 | – | – | – | – | 17 | 16 |
| 1 | 12 | – | – | 11 | 9 | – | – | 10 | 17 | – | – | 16 | 14 | – | – | 15 |
| 2 | – | 11 | 10 | – | – | 12 | 9 | – | – | 16 | 15 | – | – | 17 | 14 | – |
| 3 | – | – | 9 | 10 | 12 | 11 | – | – | – | – | 14 | 15 | 17 | 16 | – | – |
| 4 | – | – | 11 | 9 | – | – | 10 | 12 | – | – | 16 | 14 | – | – | 15 | 17 |
| 5 | 11 | – | 12 | – | – | 10 | – | 9 | 16 | – | 17 | – | – | 15 | – | 14 |
| 6 | – | 9 | – | 12 | 10 | – | 11 | – | – | 14 | – | 17 | 15 | – | 16 | – |
| 7 | 10 | 12 | – | – | 11 | 9 | – | – | 15 | 17 | – | – | 16 | 14 | – | – |
| 8 | 10 | – | 9 | – | 12 | – | 11 | – | 15 | – | 14 | – | 17 | – | 11 | – |
| 9 | – | – | – | – | 9 | 11 | 10 | 12 | – | – | – | – | 14 | 16 | 15 | 17 |
| 10 | 11 | 9 | 12 | 10 | – | – | – | – | 16 | 14 | 17 | 15 | – | – | – | – |
| 11 | – | 12 | – | 11 | – | 10 | – | 9 | – | 17 | – | 16 | – | 15 | – | 14 |

INVENTORS A. E. JOEL, JR
M. E. KROM
BY
ATTORNEY

Sept. 23, 1958 A. E. JOEL, JR., ET AL 2,853,562
SERVICE OBSERVING CIRCUIT
Filed Dec. 28, 1955 11 Sheets-Sheet 10

INVENTORS A. E. JOEL, JR.
M. E. KROM
BY
ATTORNEY

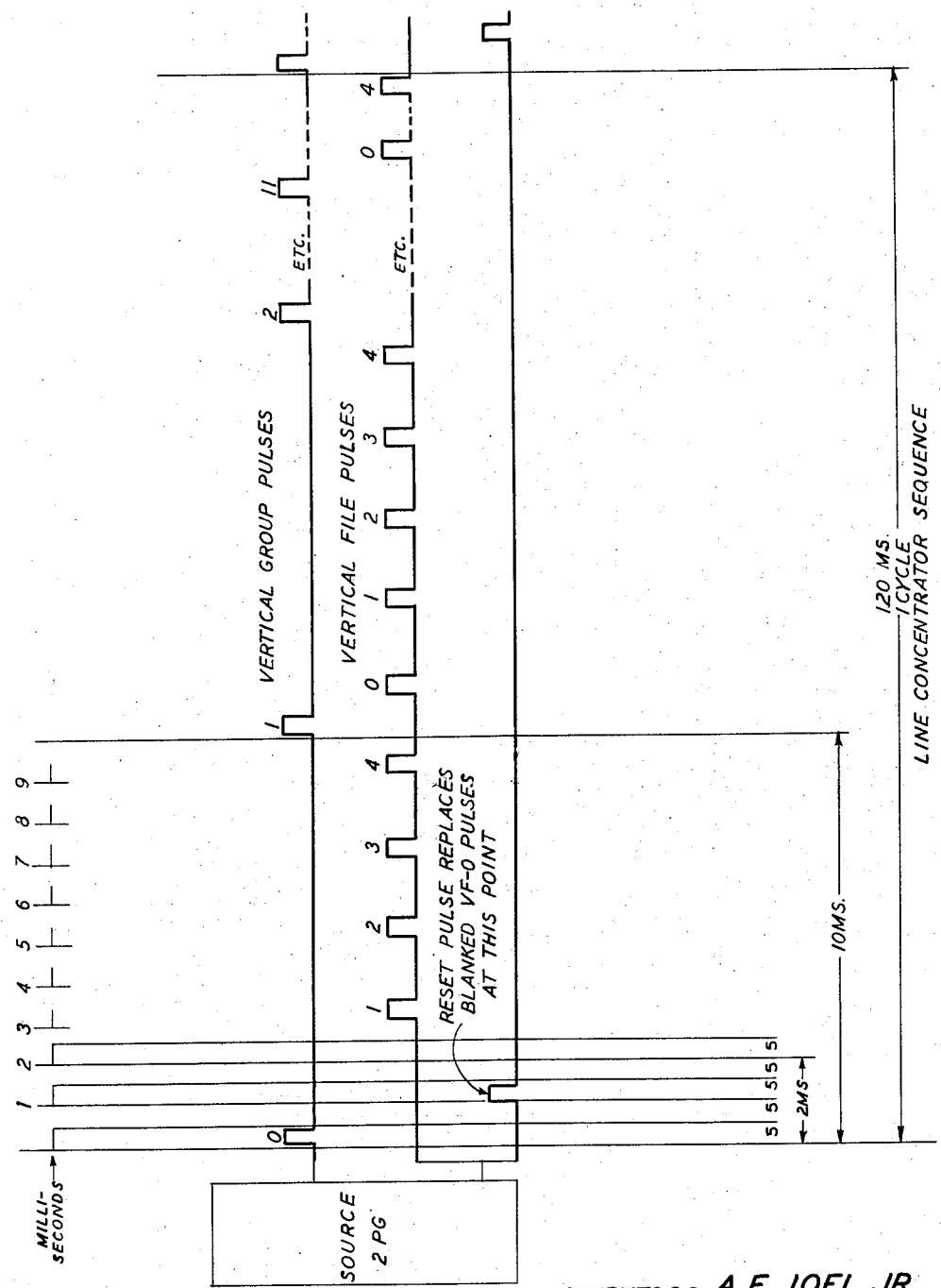

United States Patent Office 2,853,562
Patented Sept. 23, 1958

2,853,562
SERVICE OBSERVING CIRCUIT

Amos E. Joel, Jr., South Orange, and Myron E. Krom, Convent Station, N. J., assignors to Bell Telephone Laboratories Incorporated, New York, N. Y., a corporation of New York Application December 28, 1955, Serial No. 555,944

20 Claims. (Cl. 179—175.2)

This invention relates to telephone service observation equipment and more particularly to service observing circuits for line concentrator telephone systems.

Service observation may be either routine observation or complaint observation. Routine observation is utilized as a random check of the telephone service provided to a group of telephone subscribers. A sampling of the calls originating at one of the subscriber lines may be utilized for the routine observation. Complaint observation is utilized when a telephone subscriber registers a complaint or inquiry concerning the nature of the service provided. The substance of the complaints embraces almost the entire range of telephone service and includes such items as wrong numbers, don't answer calls, overcharges and various other occurrences generally based upon some improper use of the calling device or faulty performance of the telephone line or central office equipment. For complaint observation it is advisable to determine from an actual observation of all the calls originating at the subscriber line whether poor service is being rendered and if so to determine the cause.

In order for a routine or a complaint observation operator to observe, monitor or supervise the operation of the switching equipment involved in serving a subscriber line responsive to the origination of a call thereon, the operator must receive an indication of the origination of a call on the line and must be provided with a bridging talking connection across the line. When the subscriber line terminates at or is connected directly to the central office the provision of such indication and connection is a relatively simple matter. However, in concentrator telephone systems, for example, of the type described in the Joel-Krom-Posin Patent No. 2,812,385, issued on November 5, 1957, the subscriber lines terminate in the line concentrators which are each connected by relatively few concentrator trunks to the central office. The central office is therefore not directly in information communication with the subscriber lines due to the interposition of the remote line concentrator.

It is a general object of this invention to provide line observation facilities for routine and for complaint observation for subscriber lines in a line concentrator telephone system.

As described in the above-identified disclosure of Joel-Krom-Posin, line concentrator systems effect considerable savings in the cost of operation of the telephone plant by avoiding the necessity of providing a separate direct connection from the central office to each subscriber line. The greater the ratio of subscriber lines to concentrator trunks, without loss of telephone service, the greater are the savings. A feature therefore of this invention relates to means for providing service observation facilities in a line concentrator system without utilizing a separate observation trunk. The service observation is provided over existing concentrator trunks without interfering with normal telephone service.

In the line concentrator system described in the above-identified disclosure of Joel-Krom-Posin, the subscriber lines are connected to the concentrator trunks on a random slip multiple basis: that is, each subscriber line is connectable to only some of the concentrator trunks. The trunks that are connectable to a subscriber line are referred to as a trunk multiple. The term random slip indicates that the lines have access to different combinations of trunks or that the trunks are different in different trunk multiples. In addition to the random slip trunk multiplying, a preference is provided for the selection of the trunks in each slip multiple. The preference selection distributes the calling load because a trunk which is common to more than one multiple may have a different preference in each multiple.

In an illustrative embodiment of this invention, when routine observation is provided for a subscriber line, a service observation control at the central office is set to register the identity of the subscriber line and an observation switch is set to connect the preferred trunk of the line to an observation circuit. When a call is originated at the subscriber line and the preferred trunk is selected for the dial-tone connection, an indication is provided by the service observing control to an observation operator at the observation circuit. When the observation operator receives the service observation indication, a connection is made at the observation line circuit to the preferred trunk. In this manner a bridging connection is provided at the central office to the preferred trunk. Routine observation is therefore provided without the necessity of a separate bridging or observation trunk between the concentrator and the central office. Only a sampling of originating calls may be observed because the preferred trunk must be selected in order for the provision of an indication to the observation operator. By observing only on "preferred trunk" calls, the switch connecting the observation trunk to the concentrator trunk may effectively be merely a jumper.

Still another feature of this invention relates to complaint observation means which enables the observation of a line for all calls originating thereat. For complaint observation, the observation switch is an automatically operating circuit for establishing a connection from the observation trunk to any one of the concentrator trunks. It is not set to preselect any one of the concentrator trunks. When a concentrator trunk is selected, the observation switching circuit readies a connection from the observation trunk to the selected trunk. When the call is from the observed line, the observation control provides an indication to the operator at the observation circuit and operates the switching circuit to complete the path from the observation trunk to the selected trunk. In this manner all calls from a subscriber line may be observed independently of which of the concentrator trunks is utilized.

Still another feature pertains to means effective when a call is originated at a predetermined subscriber line for providing an observation indication before the initiation of a trunk selecting sequence of operation. The indication is provided as soon as the line identity is registered at the central office.

Still another feature of this invention relates to means for providing service observation for any one of the lines that is connected to any one of a plurality of concentrators.

In line concentrator systems, in addition to routine and complaint observation, it is also advisable to provide concentrator trunk observation. Still another feature of this invention relates therefore to means for observing all the calls originating at the concentrator and which utilize a predetermined one of the concentrator trunks. The service observing circuit is connected by the observation switch or a jumper to the concentrator trunk, and the service observation control is set at the identity of the concentrator trunk. When the concentrator trunk is selected for connection to any calling line, an indication is provided to the observation operator.

Further objects and features will become apparent to those skilled in the art upon consideration of the following description read in conjunction with the drawings wherein:

Figs. 1 through 8, arranged in accordance with Fig. 9, provide a circuit representation of the line concentrator and service observation system of the present invention, wherein:

Fig. 9 illustrates the arrangement of Figs. 1 through 8;

Fig. 10 is a table illustrating the slip multiple connections and the trunk preference for each multiple;

Figs. 11 and 12 are tables illustrating the connections of the armatures of relays 6VG0–11 which are shown in Fig. 6;

Fig. 14 is a series of pulse time curves illustrating the scanning sequence utilized in the line concentrator system.

Referring to Figs. 1 through 8, when arranged in accordance with Fig. 9, the first digit of each reference number indicates the figure in the circuit drawings in which the relay or component appears and the letters indicate the function thereof. Relay 2HG0, for example, is the horizontal group relay 0 and appears in Fig. 2.

Before proceeding with a description of the service observation system of this invention, the line concentrator normal scanning sequence of operations is briefly described. The scanning system is described in detail in the copending application by Almquist-Joel-Posin, Serial No. 555,916, filed on even date herewith. The scanning system is briefly described herein because it is utilized, as is hereinafter described, during the establishment of a dial-tone connection for any one of the subscriber lines.

*Normal scanning*

Figure 1:
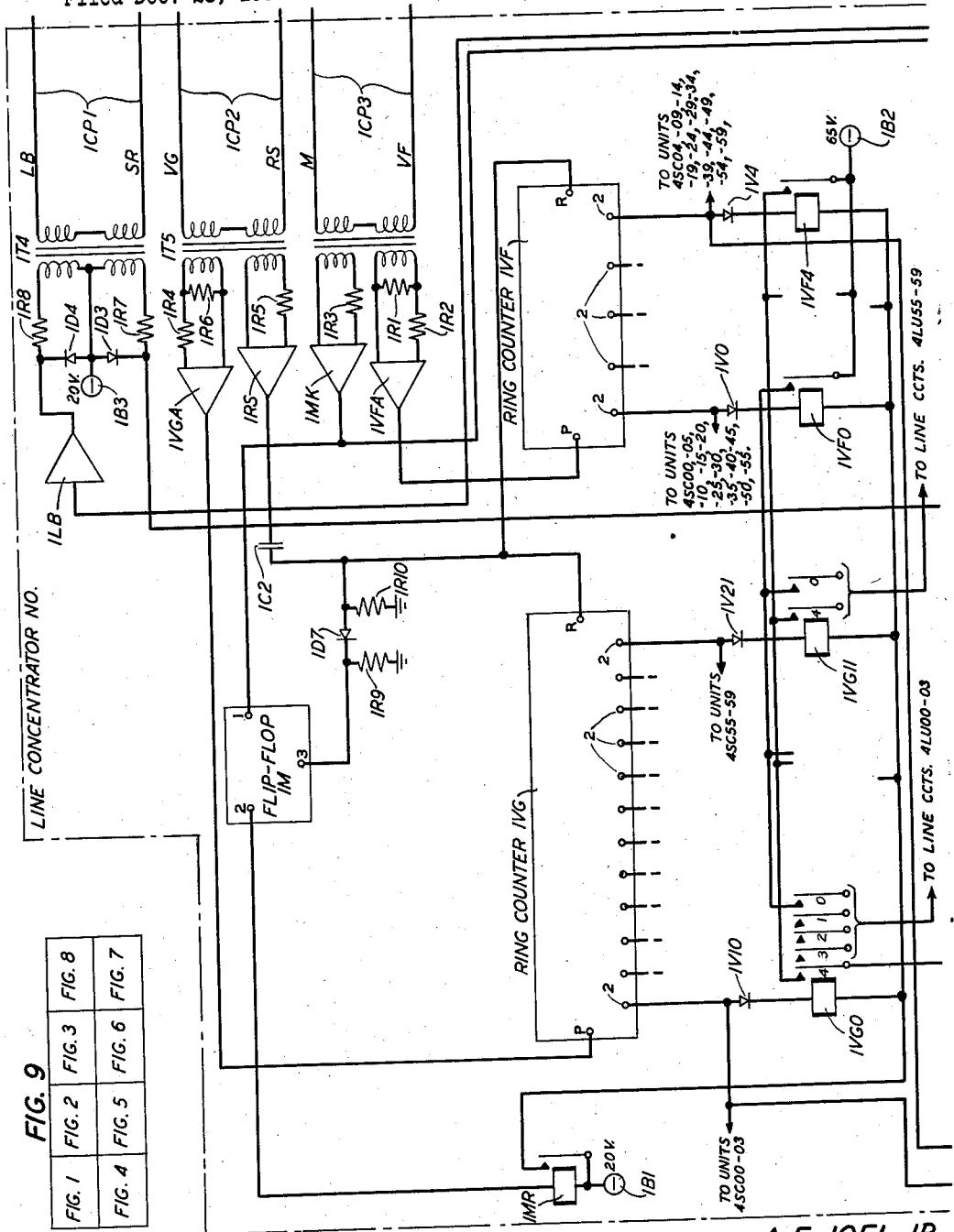
Figs. 1 and 4 show a circuit representation of the line concentrator.
Figure 2:
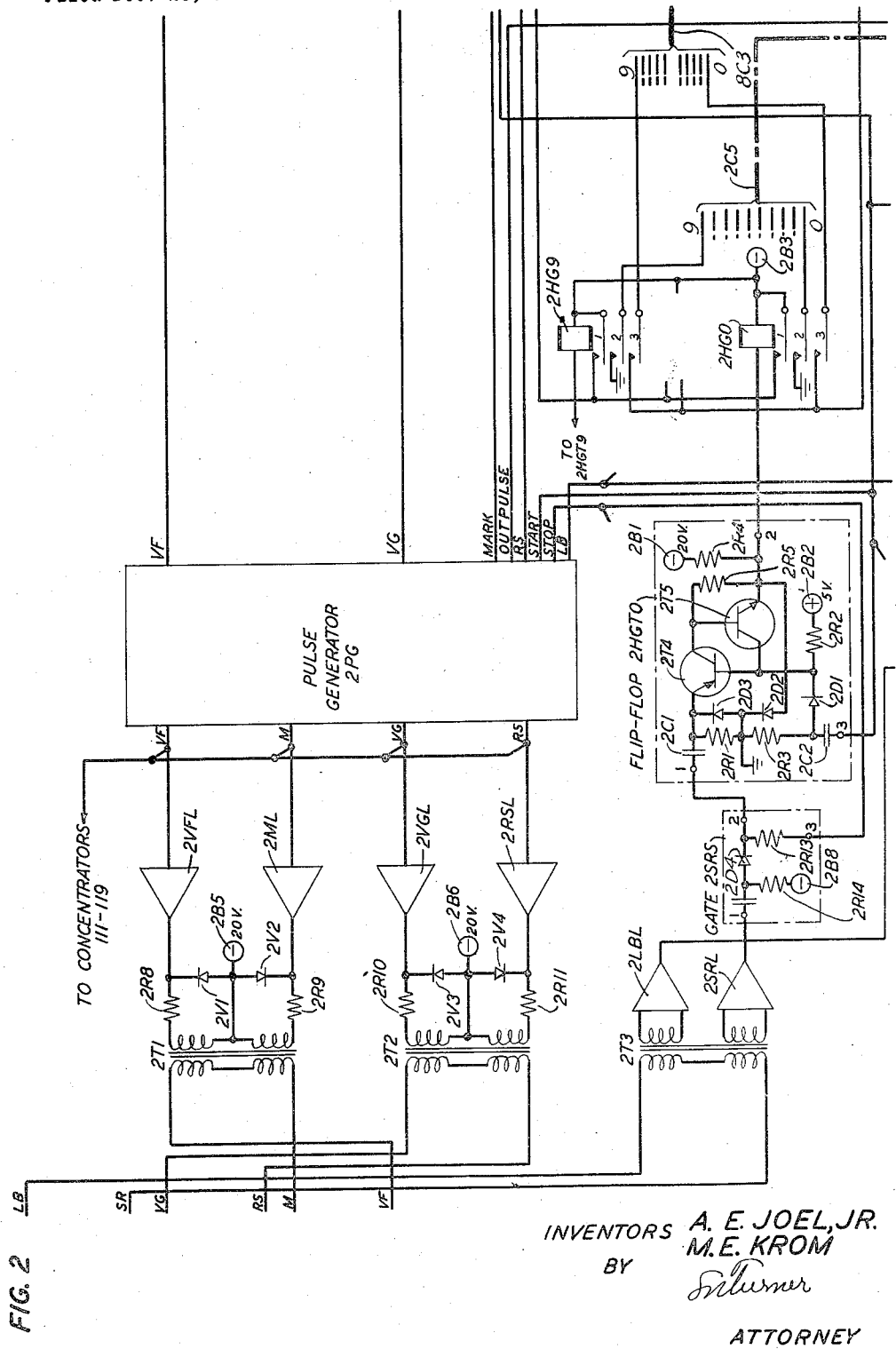
Figs. 2, 3 and 5 through 8 show a circuit representation of the central office.
Figure 3:
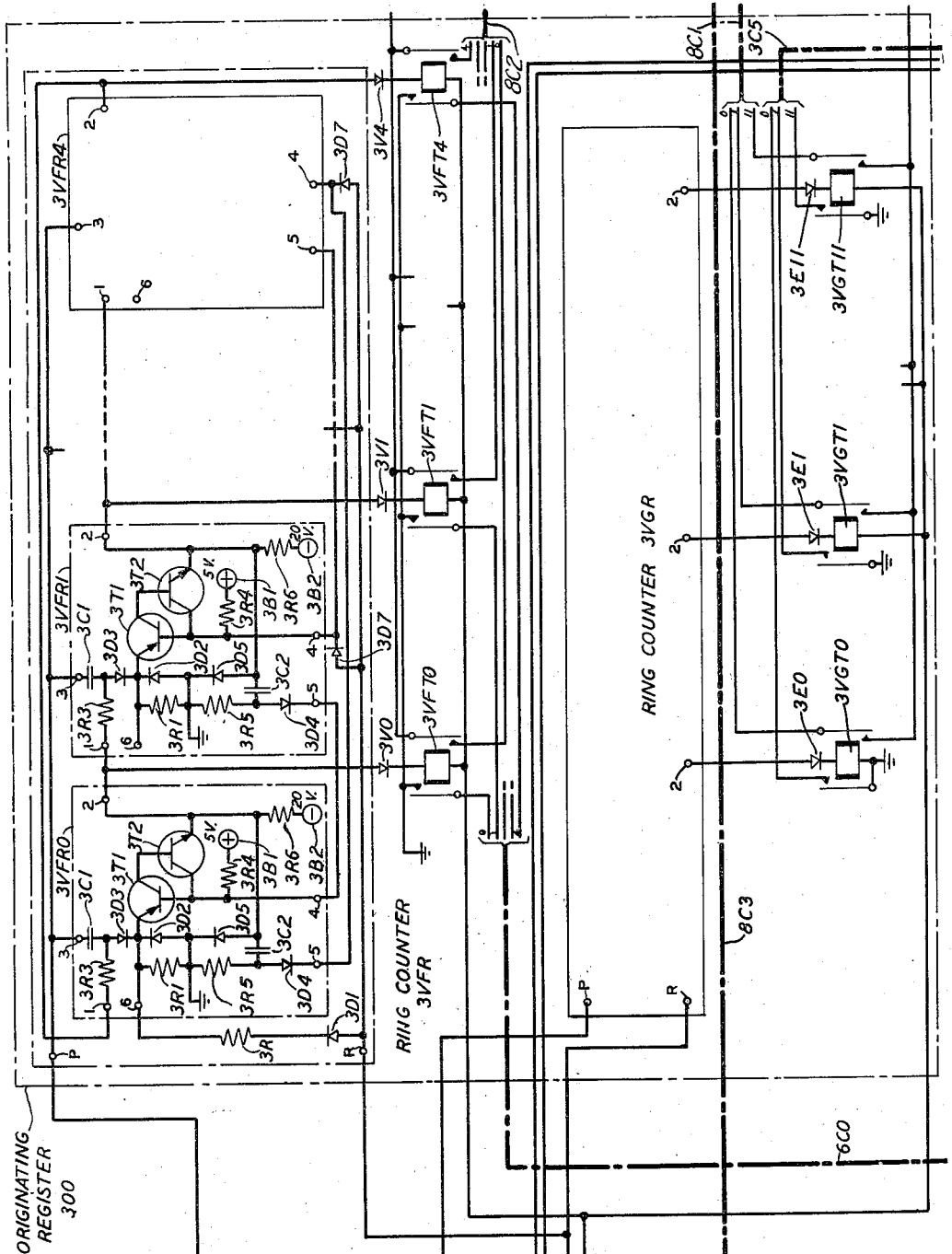
Figure 4:
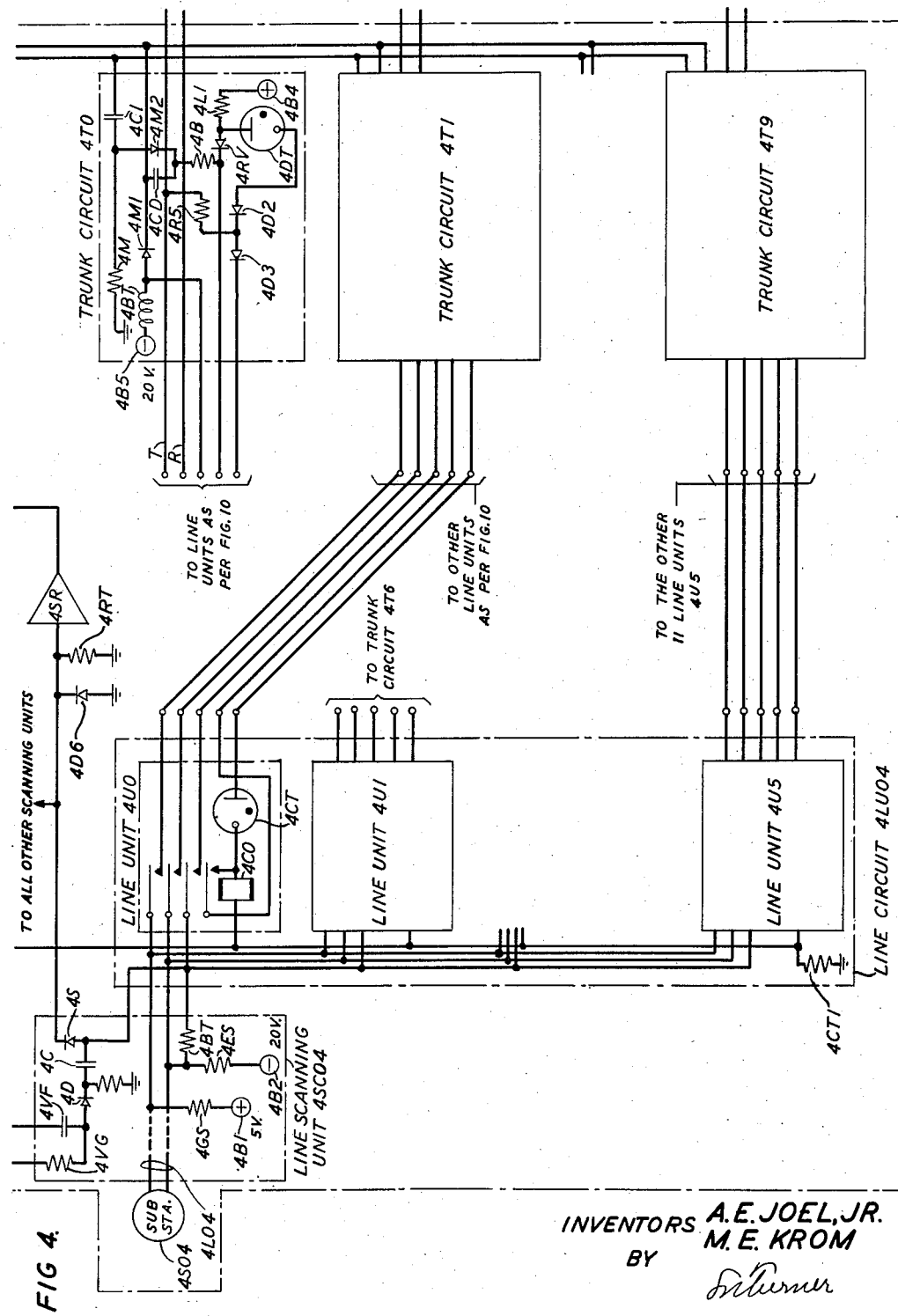
Figure 5:
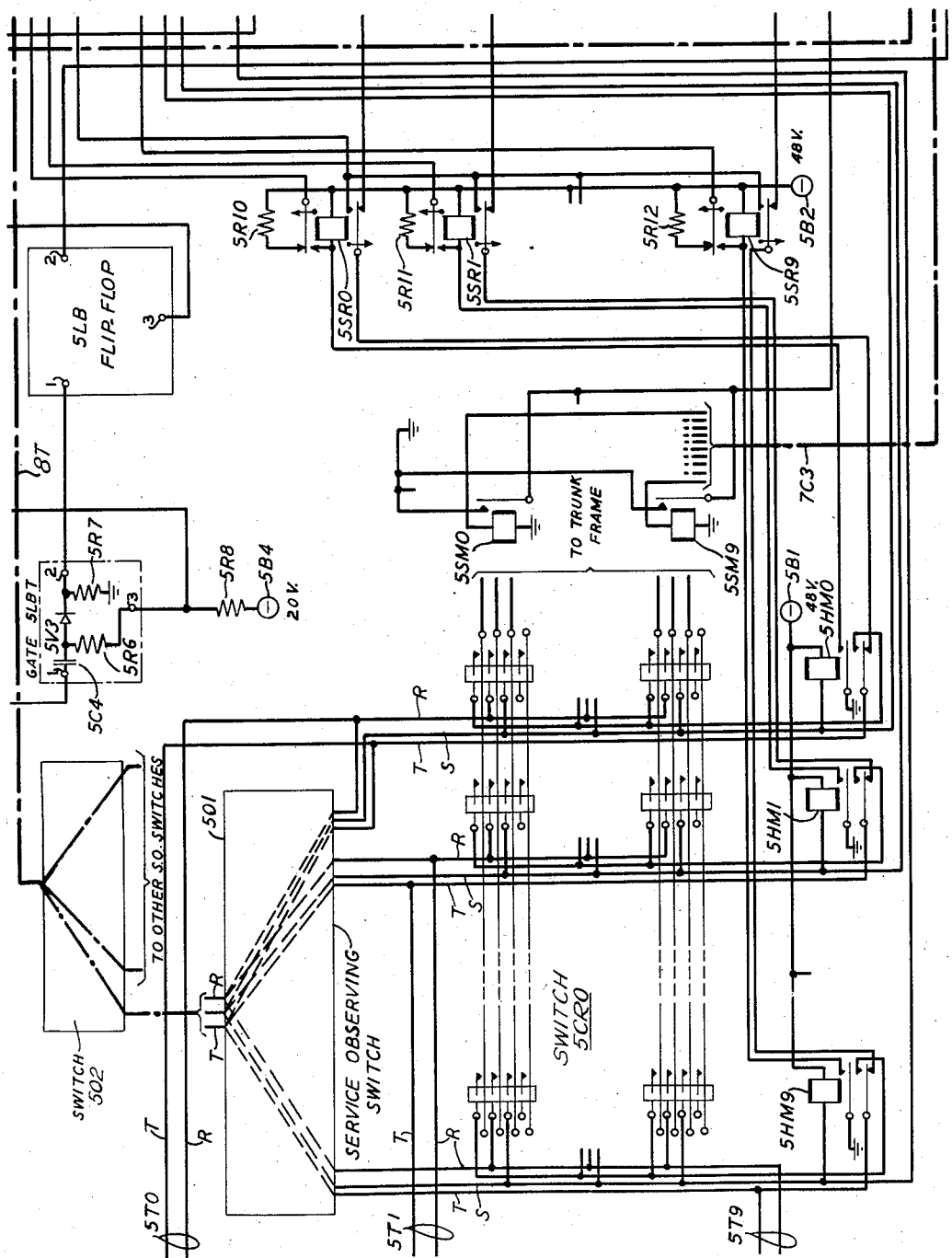

The line concentrator 110 shown in Figs. 1 and 4 is located at a remote location from the central office equipment shown in Figs. 2, 3 and 5 through 8. Ten line concentrators 110–19 are connected to the central office equipment, though only one, the line concentrator 110, is shown. The line concentrator 110 provides a connection from 60 subscriber substations 4S00–59 to the central office. Only the substation 4S04 is shown. The effect of utilizing the line concentrator 110 is to place a part of the switching equipment of the central office at a distance therefrom in order to conserve outside plant facilities. The line concentrator 110 is connected to the central office by ten trunks 5T0–9 and three control pairs 1CP1–3. The trunks 5T0–9 provide talking paths between the line concentrator 110 and the central office and the three control pairs 1CP1–3 provide for signaling paths to and from the central office equipment. With all 600 subscriber lines idle, the central office continuously and synchronously scans the ten groups of 60 subscriber lines.

The ten line concentrators 110–19 are synchronously scanned under control of a scanner pulse generator 2PG, which is described in detail in the above-identified disclosure of Joel-Krom-Posin. The scanner pulse generator 2PG simultaneously provides scanning pulses through the ten sets of three control pairs 1CP1–3 to the ten line concentrators 110–19 and also to a concentrator originating call register 300. The scanner pulse generator 2PG and the concentrator originating call register 300 are common control equipment for all ten concentrators 110–19. The ten line concentrators 110–19 and the register 300 are synchronously and cyclically operated under control of the scanning pulses from the generator 2PG.

The scanner pulse generator 2PG supplies four types of pulses: vretrical group pulses, vertical file pulses, reset pulses and mark pulses. As in the ordinary crossbar telephone system, the subscriber lines are arbitrarily arranged in vertical groups, vertical files and horizontal groups. Such crossbar systems are described, for example, in the Patent 2,585,904 which was granted to A. J. Busch, February 19, 1952. All the subscriber lines connected to one of the ten concentrators 110–19 are in the same horizontal group and they are subdivided into twelve vertical groups, each of which includes five vertical files. The vertical group pulses supplied by the scanner pulse generator 2PG select a group of five lines connected to each of the line concentrators 110–19. The vertical group pulse is supplied simultaneously to the ten line concentrators 110–19 so that 5 times 10, or 50, subscriber lines are selected. Between two such vertical group pulses, the scanner pulse generator 2PG supplies five vertical file pulses to the concentrators 110–19, as shown in Fig. 14 which illustrates the normal scanning pulse sequence. One subscriber line connected to each of the concentrators, or ten in all, is scanned by each vertical file pulse. In order to scan the 600 lines, the scanner pulse generator 2PG provides to each of the ten line concentrators 110–19 and to the register 300, twelve 15-volt vertical group pulses spaced at intervals of 10 milliseconds and five 15-volt vertical file pulses spaced at intervals of 2 milliseconds between each pair of vertical group pulses. The vertical file and vertical group pulses are ½ millisecond pulses and the complete scanning cycle has a duration of 120 milliseconds.

In addition to the vertical group and the vertical file pulses, the generator 2PG supplies one reset pulse at the beginning of the cycle to ensure the synchronous operation of the line concentrator scanning cycles and the originating call register cycle with that of the generator 2PG. The reset pulse, as is hereinafter described, also functions as the first vertical file pulse so that only 59 vertical file pulses are provided instead of 60 for a single cycle.

To recapitulate, during one scanning cycle, the pulse generator 2PG supplies one reset pulse, twelve vertical group pulses and 59 vertical file pulses. One vertical file pulse is provided, if the reset pulse is counted as a vertical file pulse, for each of the 60 subscriber lines.

The scanner pulse generator 2PG also provides mark pulses which are utilized, as is hereinafter described, when a call to or from one of the 600 subscriber lines is being serviced.

The originating register 300 has two ring counters 3VFR and 3VGR. The counter 3VFR is a five-stage ring counter having stages 3VFR0–4 and the counter 3VGR is a twelve-stage ring counter. A ring counter may be referred to as a walking circuit or a sequence circuit which advances one step for each input pulse supplied thereto. The vertical file pulses from the generator 2PG are supplied through the counter input terminal P to the input terminal 3 of each of the five stages 3VFR0–4. A single counter stage, such as the stage 3VFR0, may be thought of as a combination of an enabling gate and flip-flop circuit. A stage is said to be gated when its gate is enabled and is said to be "on" when its flip-flop circuit is set. A stage may be turned on only if its gate is enabled to allow the input pulse through to set, or turn on, its flip-flop circuit. When a stage is turned on the potential at its output terminal 2 changes from −20 volts to −2 volts to enable the gate of the succeeding stage. Assume, for example, that at the beginning of the scanning cycle the stage 3VFR0 has its flip-flop circuit set. Only one of the stages 3VFR0–4 is set at any time, and the stage succeeding the set stage is the only gated or enabled stage. The input terminal 3, through which the positive pulse is supplied, is connected through the input coupling capacitor 3C1 and the varistor 3D3 to the emitter electrode of the transistor 3T1. The transistor 3T1 is one of two junction transistors 3T1 and 3T2, which are connected in a hook arrangement to function as a point contact transistor. Such arrangements are described, for example, in the Patent 2,655,609 which was granted to W. Shockley on October 13, 1953. The emitter electrode of transistor 3T1 is connected to ground through the resistor 3R1 and through the varistor 3D2. The resistor 3R1 functions as a load resistor for the input pulse and the varistor 3D2 provides a low resistance path for the emitter sustaining current, and also functions to dissipate any negative pulses to ground. The base of transistor 3T1 is connected to the collector of transistor 3T2, to the +5 volt direct-current potential source 3B1 through the base resistor 3R4 and through the reset terminal 4 to the terminal 5 of the succeeding stage 3VFR1. The emitter electrode of transistor 3T2 is connected to the output terminal 2 and to the —20 volt battery 3B2 through resistor 3R6.

With the first stage 3VFR0 on, the output terminal 2 thereof is at a potential of —2 volts due to the current through the resistor 3R6. With the —2 volt potential at terminal 2 of stage 3VFR0, the varistor 3D3 of stage 3VFR1 is relatively forward-biased or only slightly back-biased. The terminal 2 of stage 3VFR0 is connected through the terminal 1 of stage 3VFR1 and resistor 3R3 to the varistor 3D3. With the varistor 3D3 in stage 3VFR1 relatively forward-biased, the stage 3VFR1 is enabled so that an input pulse through terminal 3 thereof causes it to turn on. If stage 3VFR0 is not on and its terminal 2 is at a potential of —20 volts, varistor 3D3 in stage 3VFR1 is reversed-biased so that an input pulse through its terminal does not turn it on.

When the first pulse is supplied to the terminals 3 of stages 3VFR0–4 from the generator 2PG, it turns on the stage 3VFR1 through its enabled gate circuit, which includes the forward-biased varistor 3D3. The potential at terminal 2 of stage 3VFR1 changes from —20 volts to —2 volts to enable the stage 3VFR2 and reset the stage 3VFR0. The terminal 2 in stage 3VFR1 is connected through the capacitor 3C2 of stage 3VFR1, varistor 3D4 and terminal 5 to terminal 4 of stage 3VFR0. Terminal 4 is connected, as described above, to the base electrode of transistor 3T1. When terminal 2 of stage 3VFR1 changes in potential from —20 volts to —2 volts, the change in potential is provided to the base of transistor 3T1 in stage 3VFR0 causing the stage 3VFR0 to turn off. When the stage 3VFR0 is turned off, in this manner, the potential at its terminal 2 decreases from —2 volts to —20 volts disabling the gate circuit including the varistor 3D3 in the stage 3VFR1.

To briefly recapitulate, the first pulse supplied to terminals 1 of stages 3VFR0–4 turns on the stage 3VFR1 which enables the stage 3VFR2 and resets or turns off the stage 3VFR0. When the stage 3VFR0 is turned off, it disables the stage 3VFR1. After the first pulse, therefore, the stage 3VFR1 is turned on and the others are turned off, and the stage 3VFR2 is enabled and the others disabled.

The second pulse from the generator 2PG turns on the stage 3VFR2, which enables the stage 3VFR3, and turns off the stage 3VFR1. The stage 3VFR3, in turn, disables the stage 3VFR2. The pulses supplied to the terminals 3 of the stages 3VFR0–4 in this manner advance the setting from stage to stage with the sixth pulse being equivalent to pulse No. 1. The sixth pulse is equivalent to the first pulse because the stages 3VFR0–4 are connected in a ring with the output terminal 2 of stage 3VFR4 being connected to terminal 1 of stage 3VFR0 and the terminal 5 of stage 3VFR0 being connected to the reset terminal 4 of stage 3VFR4.

The above sequence continues from stage to stage in the counter 3VFR until the pulse generator 2PG is disabled. A similar sequence of events takes place in the counter 3VGR except that it takes twelve pulses to complete a cycle instead of five since the counter 3VGR has twelve stages.

At the beginning of each scanning cycle a positive reset pulse is supplied from the pulse generator 2PG to the register 300. The reset pulse is supplied, respectively, through the reset terminal R, and the serially connected varistor 3D1 and resistor 3R to the terminal 6 of stage 3VFR0 and also to the reset terminal R of counter 3VGR. When a reset pulse is applied to terminal 6 of stage 3VFR0 it turns the stage on since terminal 6 is connected to the emitter electrode of transistor 3T1. Terminal R is also connected through the varistors 3D7 to the reset treminals 4 of the other stages in the counters 3VFR and 3VGR to reset or turn off these stages. At the beginning of each cycle, therefore, the pulse generator 2PG supplies a reset pulse to the counters 3VFR and 3VGR to return them to normal with only the first stage in each counter set. As shown in Fig. 14, the generator 2PG does not supply a vertical file pulse when the reset pulse is supplied. The reset pulse functions as the first vertical file pulse since it is supplied to the input terminal 6 of stage 3VFR0 and advances the vertical file counter 3VFR from stage 3VFR4 to stage 3VFR0. The generator 2PG therefore supplies twelve vertical group pulses, one reset pulse and 59, not 60, vertical file pulses to the register 300 during one scanning cycle.

The pulse generator 2PG supplies the vertical file, vertical group and reset pulses to the counters 3VFR and 3VGR, as described above, and also through the sets of control leads 1CP1–3 to the concentrators 110–19.

The vertical file pulses are supplied from the generator 2PG through amplifier 2VFL and resistor 2R8 to the upper primary of transformer 2T1 which, in turn, is connected to —20 volt battery 2B5 and to the varistor 2V1. The secondary of transformer 2T1 is connected through the control pair 1CP3 to the concentrator 110. The vertical group pulses are supplied from the generator 2PG through the amplifier 2VGL, resistor 2R10 and the upper primary of transformer 2T2. The upper primary of transformer 2T2 is also connected to the —20 volt battery 2B6 and to varistor 2V3. The secondary of transformer 2T2 is connected through the control pair 1CP2 to the concentrator 110. The reset pulses are supplied through amplifier 2RSL, and resistor 2R11 to the lower primary of transformer 2T2 which is shunted by varistor 2V4.

During the normal scanning cycle, the scanner pulse generator 2PG continuously and cyclically provides the vertical group, vertical file and reset pulses to the line concentrator originating call register 300 and to the ten concentrators 110–19. The concentrators 110–19 each includes a vertical group ring counter 1VG and a vertical file ring counter 1VF which are cyclically and synchronously operated with the ring counters 3VGR and 3VFR. The counters 1VG and 1VF are similar to the counters 3VGR and 3VFR. The vertical file, vertical group and reset pulses are supplied through the ten sets of three control pairs 1CP1–3 with each set of three control pairs 1CP1–3 being connected to one of the line concentrators 110–19. The line concentrator 110, shown in Figs. 1 and 4, is connected through one set of the control pairs 1CP1–3 to the transformers 2T1–3. The vertical group, vertical file and reset pulses, provided in this manner to each of the ten line concentrators 110–19, cyclically and synchronously operate the ring counters 1VG and 1VF in each of the ten concentrators 110–19.

At the line concentrator 110 the control pairs 1CP1–3 are connected, respectively, to the secondaries of the transformers 1T4–6. The lower primary of the transformer 1T6, which is shunted by the resistor 1R1, is connected through resistor 1R2 to the vertical file receiving amplifier 1VFA. The upper primary winding of the transformer 1T5, which is shunted by the resistor 1R6, is connected through resistor 1R4 to the vertical group receiving amplifier 1VGA. The lower primary winding of the transformer 1T5 is connected through the resistor 1R5 to the reset amplifier 1RS.

The amplified vertical file pulses are supplied from the amplifier 1VFA to the input terminal P of the five-stage vertical file ring counter 1VF. The vertical group pulses are supplied from the amplifier 1VGA to the input terminal P of the vertical group ring counter 1VG. The amplified reset pulse from the amplifier 1RS is supplied through the capacitor 1C2 to the reset terminals R of the counters 1VF and 1VG. The capacitor 1C2 is connected to the grounded resistor 1R10 which provides a recharge path for the capacitor 1C2. The counters 1VF and 1VG are stepped, in the manner, by the vertical group and vertical file pulses in synchronism with the counters 3VFR and 3VGR under control of the generator 2PG.

Capacitor 1C2 is also connected through varistor 1D7 to the reset terminal 3 of the flip-flop circuit IM which is similar to the hereinafter described flip-flop circuit 2HGT0. Briefly, the circuit IM is a bistable device which is set when an input pulse is provided to terminal 1 and reset when a pulse is provided to terminal 3. Terminal 3 is connected to ground through resistor 1R9. The reset pulse insures that the flip-flop circuit IM is reset at the beginning of each scanning cycle.

As long as there are no service requests from any of the 60 subscriber lines 4L00–59, or a terminating call thereto, eleven sets of counters, one in the central office register 300 and one in each of the line concentrators 110–19, synchronously step through the count of 60, with a reset pulse being supplied at the beginning of each cycle to insure the synchronism of the sets of counters.

At each combination of operated counter stages in counters 1VG and 1VF, a pulse is directed to scan one of the 60 lines 4L00–59 by the line scanning units 4SC00–59. Only line 4L04 and unit 4SC04 are shown in the line concentrator 110. Each of the line scanning units 4SC00–59 has two gating circuit components, one controlled by the counters 1VF and 1VG and the other controlled by the condition of the associated line. The first gating circuit component which includes the varistor 4D functions as an enabling or readying component for the scanning unit.

The ring counter 1VG functions to successively ready groups of five line scanner units at a time, by changing the reverse-bias across the varistor 4D from —20 volts to —2 volts. When the first stage in counter 1VG, for example, is set, a relatively positive potential is provided from the first output terminal 2 thereof through resistors 4VG of the five line scanner units 4SC00–4 to the respective varistors 4D. The five varistors 4D in the units 4SC00–4 become biased to allow the passage of pulses from the ring counter 1VF through capacitors 4VF. The varistors 4D in the other 55 units 4SC05–59 are reversed-biased by the —20 volt potential at terminals 2 of the other eleven stages of counter 1VG.

The ring counter 1VF provides scanning pulses successively to twelve line scanning units at a time. When the fourth, or last, stage for example, is set, a positive pulse is provided from the terminal 2 thereof to the capacitors 4VF in the units 4SC04, 4SC09, 4SC14, 4SC19, 4SC24, 4SC29, 4SC34, 4SC39, 4SC44, 4SC49, 4SC54 and 4SC59. Of these, only the unit 4SC04, however, has been readied at this time by the ring counter 1VG. The positive pulse from terminal 2 of the last stage of counter 1VF, therefore, passes through the capacitor 4VF of the unit 4SC04, varistor 4D and capacitor 4C to the varistor 4S. The varistor 4S is part of the second gating circuit component which is controlled by the line condition.

In the unit 4SC04 the line 4L04 has associated therewith a resistor 4GS, which is connected from the tip lead T to the +5 volt battery 4B1, and a resistor 4ES which is connected from the ring lead R to the —20 volt battery 4B2. If the subscriber line 4L04 is open, the —20 volt battery 4B2 functions to reverse-bias the varistor 4S so that the scanning pulse from the ring counter 1VF is not transmitted through the varistor 4S. When, however, the subscriber line 4L04 is in a calling condition with the line closed, a circuit is completed from battery 4B1 through resistor 4GS, substation 4S04 and resistor 4ES to battery 4B2. The potential at the junction between varistor 4S and capacitor 4C becomes sufficiently positive to allow the scanning pulse from the last stage of the ring counter 1VF to pass through the varistor 4S, amplifier 4SR, and resistor 1R7 to the lower primary of transformer 1T4. Negative potentials are suppressed by the varistor 4D6 which is paralleled by resistor 4R7.

The scanning units 4SC00–59, in this manner, allow the vertical file pulses to pass through as a service request pulse when both gating circuit components are enabled. The first component, which includes varistor 4D, is enabled by the counter 1VG, and the second component, which includes varistor 4S, is enabled when the associated line is closed. However, when the line 4L04 is connected to one of the trunks 5T0–9 and is therefore in a busy condition, the varistor 4S, as is hereinafter described, is reverse-biased.

If all the lines 4L00–59 remain idle, the scanning sequence continues under control of the three sets of pulses, the vertical group, the vertical file and the reset pulses from the central office. Each vertical group pulse readies five line scanning units, and each vertical file pulse scans one of the five readied line scanning units. In this manner the five readied line scanning units are successively scanned by the five vertical file pulses which occur between two of the vertical group pulses. At the time position for the first vertical file pulse the vertical file pulse is actually omitted, as described above, and a reset pulse is transmitted from the central office to insure that the counters 1VG and 1VF are in the start position. The first stage however, when reset, supplies a scanning pulse to the scanning unit 4SC00.

*Routine service observation in response to a service request*

When routine service observation is to be provided on one of the subscriber lines 4L00–59, the service observation control 810 is set to register the identity of the line to be observed. If line 4L04 of concentrator 110 is to be observed, the switch 8HG is set at terminal 0, the switch 8VF is set at terminal 4, the switch 8VG is set at terminal 0 and the trunk selector switches 8A–I are set at terminals L. When the switches 8A–I are set at terminals L, service observation is provided on a particular line and when the switches 8A–I are at any other terminal, service observation is provided, as is hereinafter described, for a particular trunk. The switch 8HG identifies the concentrator to which the observed line or the observed trunk is connected. With switch 8VF set at terminal 4, switch 8VG set at terminal 0 and the switches 8A–I set at terminals L, when a call is initiated from line 4L04 and its preferred trunk 5T0 is utilized, an indication is provided to the service observing circuit 801.

In addition to setting the switches 8A–I, 8HG, 8VF and 8VG, the service observing switches 501 and 502 are set to connect the trunk 8T to the concentrator trunk that is preferred for line 4L04. The switch 502 selects one of the ten switches 5CR0–9 which is individually associated with the ten concentrators 110–19 and switch 501 selects one of the trunks 5T0–9 connected to the selected concentrator. As is hereinafter described, a preference is established for the selection of each set of trunks 5T0–9. For line 4L04, for example, trunk 5T0 is the preferred trunk. The switch 501 is therefore set to connect trunk 8T to trunk 5T0. The switches 501 and 502 may comprise patch cords, relays, selector switches or the like to provide for the connection from trunk 8T to trunk 5T0. Service observation is provided, in this mannner, for originating calls from line 4L04 only when trunk 5T0 is utilized. This random sampling of originating calls is utilized for the routine observation of the service provided to line 4L04.

When a call is initiated at one of the substations 4S00-59, the vertical file pulse from the ring counter 1VF is transformed by the scanning units 4SC00-59 to a service request pulse and supplied through the amplifier 4SR to the lower primary winding of transformer 1T4. The lower primary winding of transformer 1T4 is shunted by the varistor 1D3, and connected to the —20 volt battery 1B3. The secondary of the transformer 1T4 is connected through the control pair 1CP1 to the transformer 2T3 in the central office. The lower primary winding of transformer 2T3 is connected through the receiving amplifier 2SRL and the gate 2SRS to the input terminal 1 of the flip-flop circuit 2HGT0.

The gate 2SRS is an inhibiting gate which normally allows pulses through from its terminal 1 to its terminal 2. The inhibiting gate 2SRS has three terminals 1-3, with terminal 1 being the input terminal, terminal 2 the output terminal and terminal 3 the control terminal. With —20 volts at its control terminal 3, the gate 2SRS functions to allow the passage of pulses from its input terminal 1 through to its output terminal 2. The —20 volt potential at terminal 3 relatively forward-biases the varistor 2D4 which is connected thereto through the resistor 2R13. The varistor 2D4 is connected to the terminal 2 and through the capacitor 2C3 to terminal 1, and the junction between capacitor 2C3 and varistor 2D4 is connected through the resistor 2R14 to the —20 volt battery 2B8. The forward-biased varistor 2D4 allows the positive pulse from the amplifier 2SRL to appear across the resistor 2R13. In its inhibiting state the terminal 3 is at a potential of —2 volts and the varistor 2D4 is reversed-biased with a potential of approximately 18 volts. The presence of a positive 18-volt pulse across the input resistor 2R14 is insufficient to overcome the reverse-biasing of varistor 2D4 so that an output pulse does not appear across the resistor 2R3. Terminal 3 of the gate 2SRS is connected to the output terminal 2 of the flip-flop circuit 2HGT0 which provides, as is hereinafter described, the —20 volt normal potential and the —2 volt inhibiting potential.

The flip-flop circuit 2HGT0 is a bistable transistor trigger circuit having two transistors 2T4 and 2T5 connected in a hook arrangement. An electrical pulse applied to the input terminal 1 triggers the circuit from one state to the other and leaves it there until a reset pulse to its terminal 3 triggers it back again to its former state. The flip-flop circuit 2HGT0 is normal or off when its output terminal 2 is at a potential of —20 volts and off-normal, or on, when it has received a positive pulse through its input, or set, terminal 1 to change the potential at its output terminal 2 to —2 volts. A positive pulse through the reset terminal 3 restores the potential at its output terminal 2 to —20 volts. The time consumed in changing the output potential from one value to another is approximately 2/10 of a microsecond.

When the flip-flop circuit 2HGT0 is in its off condition, a very small amount of current somewhat less than 10 microamperes is supplied from the +5 volt source 2B2 through resistor 2R2, transistor 2T4 and resistor 2R1 to ground. The transistor 2T4 represents almost all of the impedance in this circuit path. With a 5-volt potential across the transistor 2T4 its emitter is back-biased so that the transistors 2T4 and 2T5 are in their low current quiescent condition. There is also a small current between the source 2B2 and a —20 volt source 2B1. This path is from source 2B2 through resistor 2R2, the base-to-collector path through transistor 2T4, the base-to-emitter path of transistor 2T5 in parallel with the collector-to-emitter path of transistor 2T5, through resistor 2R4 to battery 2B1. With transistor 2T5 being in its off, or low current quiescent condition, most of the potential drop is across it so that terminal 2 is at a potential of —20 volts.

When a positive pulse is supplied to terminal 1 of sufficient magnitude to raise the potential of the emitter electrode of transistor 2T4 above that of its base electrode, the transistor 2T4 becomes conductive. The input terminal 1 is connected through the capacitor 2C1 to the emitter electrode of transistor 2T4 and to ground through the resistor 2R1 and also through the varistor 2D3. When the transistors 2T4 and 2T5 are turned on, there is a low resistance path from ground through the varistor 2D3, the emitter-to-collector path of transistor 2T4, the base-to-emitter path of transistor 2T5 and resistor 2R4 to battery 2B1. The increase in current through the resistor 2R4 causes an 18-volt drop across it to change the potential at terminal 2 to —2 volts. The voltage drop across the collector-to-emitter path of transistor 2T5 is very small so that the collector electrode thereof is effectively at the —2 volt potential. With the emitter electrode of transistor 2T5 effectively at ground potential it is therefore 2 volts more positive than its base electrode. This condition holds the transistors 2T4 and 2T5 on to provide for the bistable operation. The circuit 2HGT0 includes a varistor 2D2 which is connected from the emitter electrode of transistor 2T5 to ground. The varistor 2D2 prevents the output terminal 2 from going positive or above ground potential.

The circuit 2HGT0 remains in this stable condition until a positive pulse is received through the reset terminal 3. The reset terminal 3 is connected through the capacitor 2C2 and varistor 2D1 to the base electrode of transistor 2T4. The junction between capacitor 2C2 and varistor 2D1 is connected to ground through the resistor 2R3. The positive pulse to the base electrode of transistor 2T4 makes it more positive than its emitter electrode and thereby turns off the flip-flop circuit 2HGT0.

The flip-flop circuit 2HGT0 is individually associated with the concentrator 110. The line concentrator system also includes nine other flip-flop circuits 2HGT1-9, not shown, which are individually associated with the nine concentrators 111-19.

When the flip-flop circuit 2HGT0 operates, it functions generally to stop the transmission of the scanning pulses to the concentrators 110-19, to close the gate 2SRS and to call in a marker 700. The marker 700 and the connectors 701 and 702 associated therewith are of the type described in the above-identified Busch patent. The change from —20 volts to —2 volts at the output terminal 2 of the flip-flop circuit 2HGT0 functions as a stop potential to the generator 2PG, causes the inhibiting gate 2SRS to close, and causes the operation of the relay 2HG0.

When the pulse generator 2PG stops, the ring counters 3VFR and 3VG remain set at the calling line identity. For a service request from line 4L04, for example, the counter 3VFR has stage 3VFR4 turned on and the counter 3VGR has the first stage turned on.

When gate 2SRS is closed, the central office becomes insensitive to service requests, and remains in this condition until circuit 2HGT0 is reset.

Terminal 2 of circuit 2HGT0 is connected to the winding of relay 2HG0 which is also connected to battery 2B3. When relay 2HG0 operates, it connects the —20 volt battery 2B3 through its operated armature 1 to one side of the windings of relays 3VFT0-4 and 3VGT0-11. The windings of relays 3VFT0-4 are connected, respectively, through the varistors 3V0-4 to the output terminals 2 of the counter stages 3VFR0-4, and the windings of the relays 3VGT0-11 are connected, respectively, through the varistors 3E0-11 to the output terminals 2 of the twelve stages in counter 3VGR. With the counters 3VFR and 3VGR stopped on the line location of the calling subscriber, a −2 volt potential is on the other side of one of the relays 3VFT0–4, and one of the relays 3VGT0–11, causing them to operate. With a service request from line 4L04, relays 3VFT4 and 3VGT0 are operated.

When relay 2HG0 operates, it also provides an indication of the identity of the line concentrator requesting service. The line concentrator identity is, as described above, the horizontal group indication which is zero for concentrator 110. Relay 2HG0 operates and connects ground through its operated armature 2 and cable 2C5 to the line link marker connector 702. When relay 3VFT4 operates, it readies a path for supplying the vertical file information to the marker 700. When relay 3VGT0 operates, it provides an indication of the vertical group identity to the marker connector 702 by connecting ground through cable 3C5 to the marker connector 702. The vertical group identity indication also functions as a start signal for the marker 700.

When relays 3VFT4 and 3VGT0 operate, they also ready a signal path through the service observation control circuit 810. With relays 3VFT4 and 3VGT0 operated, a connection is provided from the service observing circuit 801 through the ring lead of the observation trunk 8T, lead 802, the armature of switch 8HG, terminal 0 of switch 8HG, cable 8C3, armature 3 of relay 2HG0, the operated right armature of relay 3VGT0, cable 8C1, terminal 0 of the switch 8VG, the armatures of switches 8VG and 8VF, terminal 4 of switch 8VF, cable 8C2, the operated right armature of relay 3VFT4, terminal L and the armature of switch 8A to the armature 0 of the trunk selector relay 7TS0. The trunk selector relay 7TS0, is operated, as is hereinafter described, during the trunk selection sequence after the marker 700 seizes the line link connector 701. When relay 7TS0 is operated, a connection is provided from the grounded service observation resistor 7S0 to the service observing circuit 801 as an indication of the origination of a call at the observed line 4L04. The service observation indication is provided to the service observing circuit 801 before a connection is established through the concentrator 110 to the calling line 4L04.

When the marker 700 receives the start signal from the connector 702, it seizes the line link connector 701. The line link connector 701 initiates an outpulsing operation, and a trunk selection operation, in order to establish a connection from the calling line 4L04 to a selected one of trunks 5T0–9.

When the line link connector 701 is seized by the marker 700, it operates one of the horizontal group relays 6H0–9, the dial-tone relay 7D, and one of the vertical group relays 6VG0–11. In the example described above, when a call is initiated at line 4L04 and concentrator 110, the relays 6H0, 7D and 6VG0 are operated.

When the call is a terminating or call-back call instead of an originating call, a similar sequence occurs for the selection of a trunk except that a terminating or call-back relay, not shown, is operated instead of relay 7D.

When relay 6H0 is operated, it connects ground from the operated left armature of relay 3VFT4, through cable 6C0, the operated armature F4 of relay 6H0 and cable 6C1 to the line link connector 701. In this manner when relay 6H0 is operated, it supplies the vertical file information through the connector 701 to marker 700. After the marker 700 receives the vertical file information, it operates the corresponding one of the relays 7VF0–4 which is relay 7VF4 when the call is from line 4L04. When relay 7VF4 is operated, ground is connected through the operated armature 2 of relay 7D, the operated armature 1 of relay 7VF4, the operated armature 13 of relay 6VG0, the operated armature 22 of relay 6H0 to the outpulse terminal of the pulse generator 2PG.

When the outpulse terminal is grounded upon the operation of relay 7VF4, the generator 2PG supplies a reset pulse and the correct number of vertical file and vertical group pulses to set the ring counters 1VG and 1VF at the identity of the calling line. Before sending the last vertical file pulse, the generator 2PG opens the gate 5LBT to permit a line busy test. The control terminal 3 of the gate 5LBT is connected to battery 5B4 through the resistor 5R8. The battery 5B4 normally provides a −20 volt inhibiting potential to the gate 5LBT. When the enabling connection is provided to the control terminal 3 by generator 2PG, the gate 5LBT is opened and the central office becomes receptive to line busy pulses from the concentrator 110.

The gate 5LBT is a three-terminal device with an input terminal 1, an output terminal 2 and a control terminal 3. Normally with −20 volts at terminal 3, the gate 5LBT functions to prevent the passage of pulses from terminal 1 to terminal 2. Terminal 3 is connected to the varistor 5V3 through resistor 5R6 and varistor 5V3 is connected to terminal 1 through capacitor 5C4 and also to terminal 2. Terminal 2 is connected to ground through resistor 5R7. With −20 volts at terminal 3, varistor 5V3 is reverse-biased. When ground is connected to terminal 3, varistor 5V3 becomes sufficiently forward-biased to allow the passage of line busy pulses from the concentrator 110.

Figure 6:
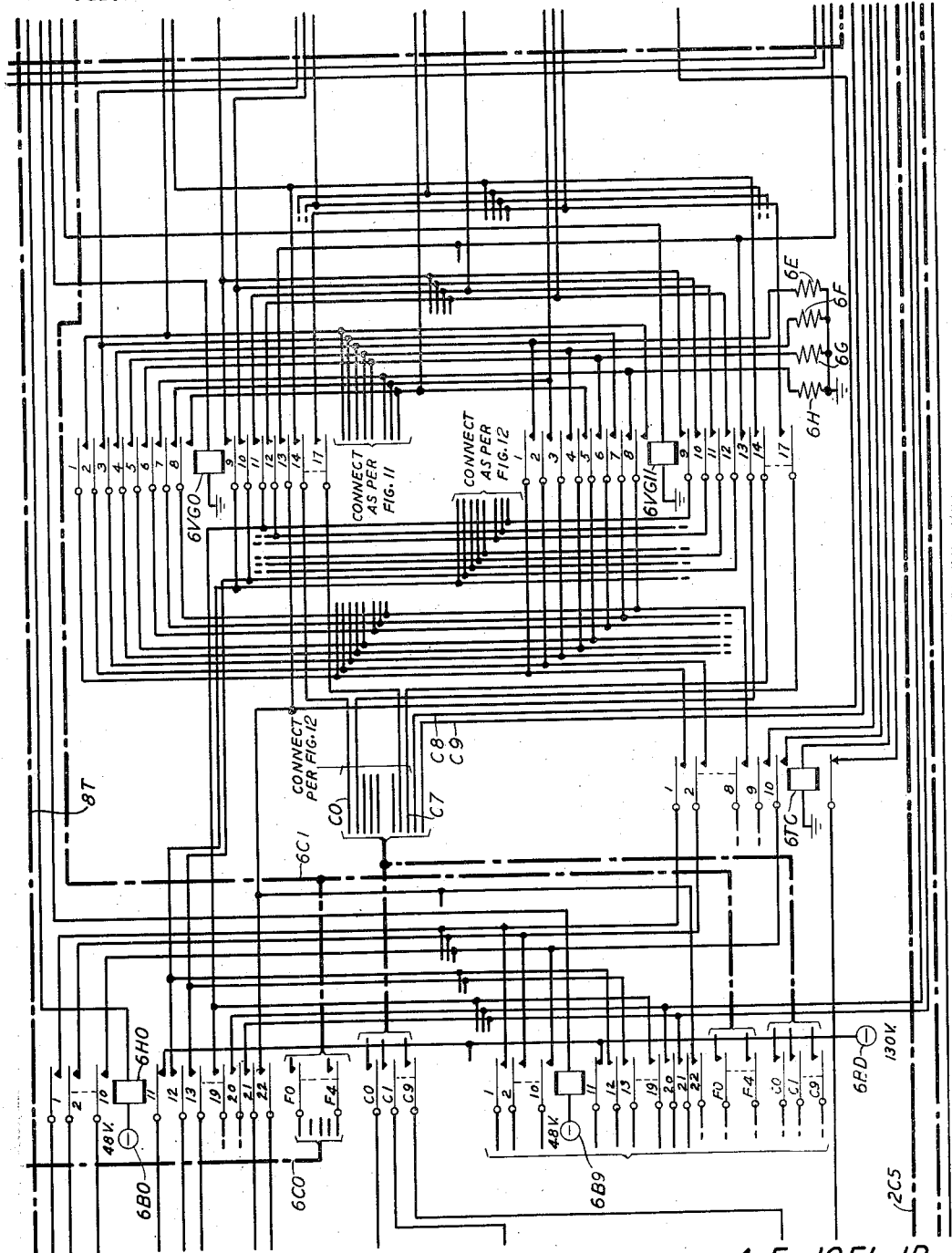
Figure 7:
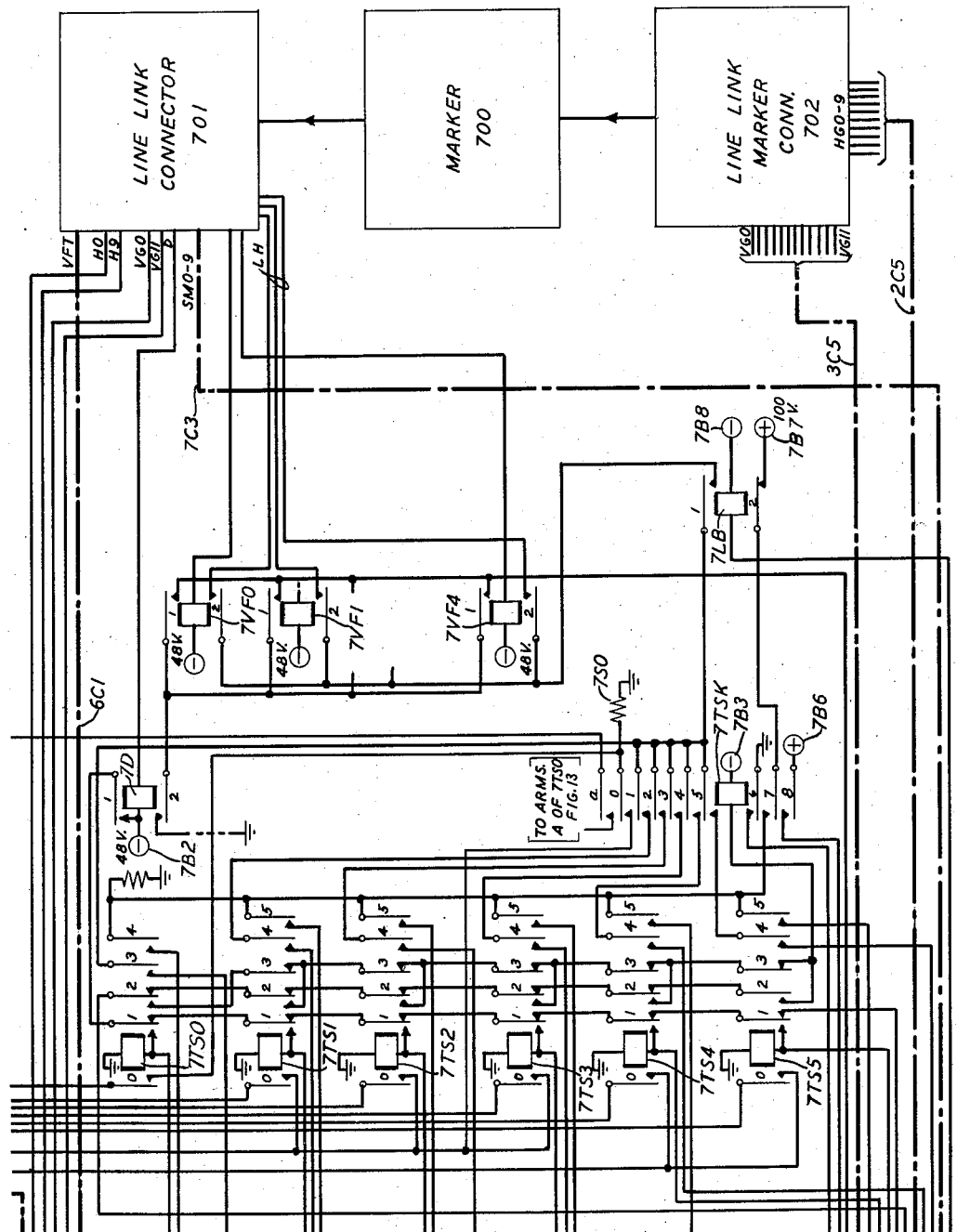
Figure 8:
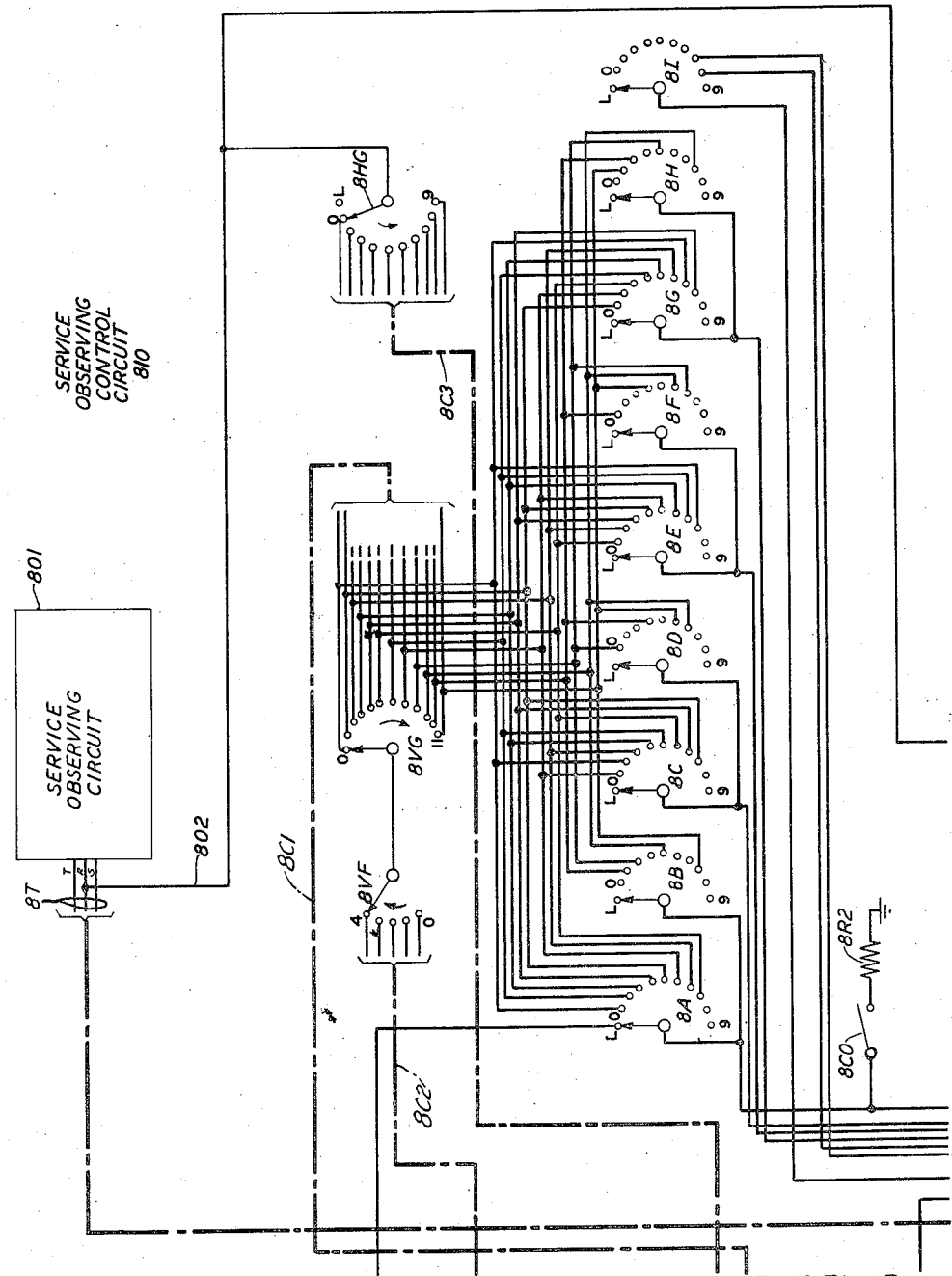

When relay 7D is operated, it, in turn, causes the operation of the trunk connect relay 6TC. The operating path for relay 6TC is from battery 7B2 through the operated armature 1 of relay 7D and the serially connected normal armatures 1 of the six trunk selecting relays 7TS0–5 to the winding of relay 6TC. When relay 6TC operates, it generally causes the operation of all six preference relays 7TS0–5. The windings of relay 7TS4 and 7TS5 are connected directly to the armatures 9 and 10 of relay 6TC, and the windings of relays 7TS0–3 are connected, respectively, through the operated armatures 1, 2, 8 and 7 of relay 6VG0 to armatures 1, 2, 8 and 7 of relay 6TC. When relay 6TC operates, it extends, respectively, the paths from the windings of relays 7TS0–5 through the operated armatures 1, 2, 8, 7, 9 and 10 of relay 6H0, the normal armatures 1 of relays 5SR0, 5SR1, 5SR7, 5SR6, 5SR8 and 5SR9, and resistors 5R10, 5R11, 5R17, 5R16, 5R18 and 5R19 to battery 5B2. The windings of the six relays 7TS0–5 are, in this manner, respectively connected through the normal armatures 1 of six of the slow release relays 5SR0–9. The windings of relays 7TS4 and 7TS5 are always connected through the normal armatures 1 of relays 5SR8 and 5SR9, and the windings of the other four relays 7TS0–3 are connected through armatures 1 of four of the relays 5SR0–7. The operation of the vertical group relays 6VG0–11 determines which four of the relays 5SR0–7 are to be utilized. As indicated in Fig. 6, Figs. 11 and 12 illustrate the connections to the armatures of relays 6VG1–10. Fig. 11, for example, illustrates that the winding of relay 7TS0 is connected to armature 1 of relay 6VG0.

There are ten sets of slow release relays 5SR0–9. The sets of relays 5SR0–9 are individually associated with ten crossbar switches 5CR0–9, of which, only switch 5CR0 is shown. The operation of relays 6H0–9 determines which one of the crossbar switches 5CR0–9 is to be utilized to service the call. The relays 5SR0–9 are normal when the associated trunks 5T0–9 are idle because trunks 5T0–9 are connected to the verticals of the switch 5CR0. If trunk 5T0, for example, is busy, the hold magnet 5HM0 is operated, and a path is completed through the operated armature 1 of relay 5HM0 for the relay 5SR0. With the relay 5SR0 operated, the operating path for the trunk selecting relay 7TS0 through its armature 1 is not completed. In this manner the trunk selecting relays 7TS0–5 are operated, upon the operation of relay 6TC, only if the associated ones of the trunks 5T0–9 are idle. With all trunks 5T0–9 idle, as described above, all six trunk selecting relays 7TS0–5 are operated.

There are ten relays 5SR0–9 that are utilized and only six relays 7TS0–5. The armatures 1 of relays 5SR0–9 that are not connected to the windings of one of the relays 7TS0–5 are connected to one of the four resistors 6E through 6H. The resistors 6E–H terminate the connections from the four non-used armatures 1 of relays 5SR0–9. Fig. 11 illustrates the connections of resistors 6E–H to the armatures of relays 6VG0–11, and Fig. 12 illustrates the connections from the armatures of relays 6VG0–11 to the armatures of relays 6H0–9. The resistors 6E–6H function as locking paths for the four non-used ones of relays 5SR0–9. The paths through the windings of relays 6TS0–5 function as locking paths for the other six of relays 5SR0–9. The locking paths are utilized during the trunk selection operation to prevent the release of any operated ones of relays 5SR0–9 until the trunk selection operation is completed. When one of the hold magnets 5HM0–9 is released, the associated one of relays 5SR0–9, therefore, remains operated during the trunk selecting operation.

As described above, the windings of relays 7TS0–5 are connected through armatures of six of the ten relays 5SR0–9, which are associated individually with the trunks 5T0–9. The six associated ones of the ten trunks 5T0–9 are referred to as being in the same multiple. At the line concentrator 110, the calling line 4L04 is connectable to any one of the six trunks in the multiple but not to the other four. Fig. 10 illustrates the possible connections from line to trunk. For the line 4L04, for example, a connection may be established to any one of trunks 5T1, 5T6, 5T0, 5T7, 5T8 and 5T9. A connection cannot be established from line 4L04 to any one of trunks 5T2, 5T3, 5T4 and 5T5.

If all six trunks of the multiple are idle, all six relays 7TS0–5 are operated. The relays 6VG0–11 effectively determine the multiple at the central office just as the line circuit connections do, as is hereinafter described, at the concentrator 110. It is necessary, of course, for the multiple at each end to be the same.

When any one of the relays 7TS0–5 operates, it opens the operating path through its normal armature 1 for the relay 6TC, causing it to release. When the relay 6TC releases, it, in turn, releases all except one of the relays 7TS0–5. The operated one of the relays 7TS0–5, which has the lowest designation, remains operated and the others release. When all six relays 7TS0–5 were operated, the release of relay 6TC, in turn, releases the relays 7TS1–5, with the relay 7TS0 remaining operated. The relay 7TS0 is locked to battery 7B2 through its operated armature 1 and the operated armature 1 of relay 7D. In this manner when relay 6TC releases, only one of the six trunk selecting relays 7TS0–5 remains operated.

The relays 7TS0–5 provide for the preference selection of the six trunks connectable to the calling line. When relay 7TS0 is operated, it indicates that the preferred trunk connectable to the calling line is idle and that a connection is to be established thereto. When the call is initiated at the subscriber line 4L04, the preferred trunk is 5T0 as shown in Fig. 10 and mentioned above. In the preference column in Fig. 10, the preference of trunks is from left to right. For line 4L04 the trunk preference is 0, 1, 7, 6, 8, 9.

When relay 7TS0 operates, it provides a service observation indication to the circuit 801 by completing the readied path, described above, through lead 802. The indicating path is from ground through resistor 7S0, the operated armature 0 of relay 7TS0, the armature of switch 8A, terminal L of switch 8A, the right operated armature of relay 3VFT4, cable 8C2, terminal 4 of switch 8VF, the armatures of switches 8VF and 8VG, terminal 0 of switch 8VG, cable 8C1, the operated right armature of relay 3VGT0, the operated armature 3 of relay 2HG0, cable 8C3, terminal 0 of switch 8HG, the armature of switch 8HG, lead 802 and the ring lead of trunk 8T to the circuit 801. In the circuit 801, the ground connection energizes an indicator, not shown, to which the observation operator responds. The operator establishes a connection in the circuit 801 to the trunk 8T. The other end of the trunk 8T, as described above, is connected by the switches 502 and 501 to the trunk 5T0. The operation of relay 7TS0, in this manner, indicates the selection of the preferred trunk 5T0, and provides an indication thereof to signal the observation operator. If relay 7TS0 is not operated, the operator is not signaled. Observation is therefore not provided for all calls originating at line 4L04 but only for those for which the preferred trunk 5T0 is selected.

The routine observation is provided only for originating calls because the signaling path to circuit 801 includes armatures on the register relays 2HG0, 3VFT4 and 3VGT0 which are only operated for originating calls. By utilizing armatures on relays 6H0, 6VG0 and 7VF4 instead of relays 2HG0, 3VGT0 and 3VFT4 observation could be provided for terminating calls as well as for originating calls if so desired.

Relay 7TS0 is operated to signal the observation operator before a connection is extended from either end of trunk 5T0. The observation operator can observe the operation of the concentrator 110 to collect line 4L04 to trunk 5T0, and to observe the operation of switch 5CR0 to which the central office end of trunk 5T0 is connected.

During the trunk selecting sequence of operations, the marker 700 selects an idle connection from the trunk frame, not shown, to a horizontal of the crossbar switch 5CR0. The utilization of the switches 5CR0–9 allows for the trunk multiple connections where less than all the trunks 5T0–9 are connectable to each subscriber line. If trunk multiples were utilized, and the trunks 5T0–9 connected directly to the horizontals instead of the verticals of switches 5CR0–9, the marker 700 may select a horizontal that is not connectable to the calling line. The switches 5C80–9 allow for the connection of each horizontal to any one of the trunks, so that independent of the selected horizontal, the preferred idle trunk, in the trunk multiple connected to the calling line, is utilized.

If the tenth, or bottom, horizontal of switch 5CR0 is selected, the line line connector 701 provides an operating potential through the cable 7C3 to the winding of the select magnet 5SM9 causing it to operate. With only one of the trunk selecting relays 7TS0–5 operated, when the select magnet 5SM9 is operated, an operating path is provided for the test check relay 7TSK. The operating path for relay 7TSK is from ground through the operated armature of the select magnet 5SM9, the normal armature 11 of relay 6TC, the operated armature 2 of relay 7TS0, the serially connected normal armatures 3 of relays 7TS1–5 and the winding of relay 7TSK to battery 7B3. Relay 7TSK, in this manner, operates only after the completion of the selection of the preferred idle one of trunks 5T0–9 by the relays 7TS0–5, and upon the operation of one of the select magnets 5SM0–9.

When relay 7TSK operates, it causes the pulse generator 2PG to supply mark pulses to the concentrator 110 and it provides a connect potential to the tip of the select trunk 5T0.

When relay 7TSK operates, it connects ground to the mark terminal of the pulse generator 2PG. When the pulse generator 2PG receives the mark ground potential, due to the operation of the relay 7TSK, it initiates a marking operation for readying the six trunks in the multiple connected to the calling line 4L04. A series of mark pulses are supplied from generator 2PG through amplifier 2ML and resistor 2R9 to the lower primary of transformer 2T1. The lower primary of transformer 2T1 is connected to battery 2B5 and to varistor 2V2. The secondary of transformer 2T1 is connected through the control pair 1CP3 to transformer 1T6 in the concentrator 110. The upper primary of transformer 1T6 is connected through resistor 1R3 to the amplifier 1MK. The output of amplifier 1MK is connected to the input terminal 1 of the flip-flop circuit 1M, which is similar to the circuit 2HGT0 described above. The circuit 1M is set by the first mark pulse from the central office. When the circuit 1M is set, it operates relay 1MR, the winding of which is connected to battery 1B1. When relay 1MR operates, it connects battery 1B1 through its operated armature to the windings of relays 1VF0–4 and 1VG0–11. The windings of relays 1VF0–4 are connected, respectively, through varistors 1V0–4 to the output terminals 2 of the stages in counter 1VF. The windings of relays 1VG0–11 are connected, respectively, through varistors 1V10–21 to the output terminals 2 of the stages in counter 1VG. Since, as described above, the pulse source 2PG outpulsed, or supplied, to the concentrator 110 a number of vertical group and vertical file pulses which indicate the identity of the calling line, the counters 1VF and 1VG are set in accordance therewith. When the calling line is line 4L04, the last stage in counter 1VF and the first stage in counter 1VG are set. When a stage is set a −2 volt potential is at the associated terminal 2. With the first stage in counter 1VG and the last stage in counter 1VF set, when relay 1MR operates, it causes the operation of relays 1VG0 and 1VF4.

With one of the relays 1VF0–4 operated, and one of the relays 1VG0–11 operated a −65 volt source 1B2 is connected to one of the 60 line circuits 4LU00–59. There is one line circuit for each of the subscriber lines 4L00–59, but only the circuit 4LU04 is shown. With the counters 1VF and 1VG set at the identity of the calling line, the mark pulses are effective to select the line circuit which is individual to the calling line. Each of the line circuits 4LU00–59 has six crosspoints, or line units, 4U0–5 which are connected to the associated subscriber line. The 60 sets of line units 4U0–5 provide for connections between the 60 lines 4L00–59 and the ten trunks 5T0–9. With only six line units for each line, each line is connectable to only six of the ten trunks 5T0–9. Fig. 10 illustrates the connections from the line units, 4U0–5, in each of the circuits 4LU00–59, to the trunk circuits 4T0–9 which are individually associated with the trunks 5T0–9. As shown in Fig. 10 the subscriber lines, which are in the same vertical group, are connectable to the same six trunks. For example, the five lines 4L00–4, which are in the vertical group 0, are connectable to the trunks 5T1, 5T6, 5T0, 5T7, 5T8 and 5T9. As described above, the trunks which are utilized for a vertical group are referred to as a multiple. All twelve multiples are different in order to distribute the load carried by any one trunk. Such a distribution system of multiples is referred to a slip multiple. The lines 4L00–59 are connectable to the trunks 5T0–9 on a slip multiple basis.

As shown in the line unit 4U0, each of the line units 4U0–5 includes a serially connected relay 4C0 and gas tube 4CT. When the relay 4C0 is operated, a connection is provided from the associated line to one of the trunks 5T0–9. When the relays 1VF4 and 1VG0 are operated, as described above, the −65 volt battery 1B2 is connected to the line circuit 4LU04. The battery 1B2 is connected through the operated armature of relay 1VF4, and the operated armature 4 of relay 1VG0 to the windings of the six relays 4C0 in the circuit 4LU04. The anode of the gas tube 4CT in each of the units 4U0–5 is connected to one of the trunk circuits 4T0–9. The connection from the anode of a tube 4CT is through a varistor 4D3, and resistor 4R5, to the ring tip of the associated one of trunks 5T0–9. For example, as indicated in Fig. 10, the gas tube 4CT, shown in the line unit 4U0 of circuit 4LU04, is connected through the circuit 4T1 to the trunk 5T1. The tube 4CT does not ionize and the associated relay 4C0 does not operate until a positive connect potential is provided on the tip of the trunk 5T1 connected thereto.

When relay 7TSK is operated it provides, as briefly mentioned above, a connect potential to the tip lead of the selected trunk. More specifically, when relay 7TSK operates, a connection is provided from the +100 volt battery 7B7 through the normal armature 2 of relay 7LB, the operated armature 7 of relay 7TSK, the operated armature 4 of relay 7TS0, the operated armature 14 of relay 6VG0, the operated armature C0 of relay 6H0, the normal armature 2 of the relay 5SR0 and the normal armature 2 of the hold magnet 5HM0 to the tip lead of the trunk 5T0. The trunk 5T0 is connected by the trunk circuit 4T0 to the line unit 4U2 in circuit 4LU04. The tip lead of trunk 5T0 is connected through resistor 4R5 and varistor 4D3 to the anode of tube 4CT of unit 4U2 in circuit 4LU04. The connect potential is also provided from circuit 4T0 to line units in some of the other circuits 4LU00–3, 4LU05–09, 4LU25–29, 4LU35–44 and 4LU50–54. The other circuits, however, have not been marked, or connected, to the −65 volt battery 1B2. The combination of the −65 volts at the cathode of the tube 4CT, and the +100 volts at the anode of the tube 4CT in unit 4U2 of circuit 4LU04, causes the ionization of the tube 4CT. When the tube 4CT ionizes, relay 4C0 operates to establish a connection through the crosspoint 4U2 from the calling line 4L04 to the selected trunk 5T0.

When the crosspoint 4U2 of circuit 4LU04 is closed, the mark pulses, which are still being supplied from generator 2PG, are returned as line busy pulses through the control pairs 1CP1–3 to the central office.

When relay 4C0 operates, it forward-biases a diode 4M2 in circuit 4T0 to allow for the passage of the mark pulses. The diode 4M2 is normally reversed-biased by the battery 4B4, which is connected thereto through the resistor 4L1, varistor 4RV and resistor 4B. The other terminal of varistor 4M2 is connected to ground through the resistor 4M, and to the output of the amplifier 1MK through the capacitor 4C1. When relay 4C0 operates, it extends the connection from the −65 volt battery 1B2 through the operated armature 4 of relay 4C0, varistor 4RV and resistor 4L1 to the battery 4B4 locking relay 4C0 operated. The current through resistor 4L1 causes the potential at varistor 4M2 to decrease to allow the passage of mark pulses. With the varistor 4M2 forward-biased, the succeeding mark pulses from the central office are supplied through the amplifier 1MK, the capacitor 4C1, varistor 4M2 and capacitor 4CD to the line busy amplifier 1LB. In this manner the succeeding mark pulses are routed back to the central office through the amplifier 1LB as line busy pulses to indicate that the crosspoint relay 4C0 has operated. Battery 4B5 in circuit 4T0 is connected through the inductor 4BT and the operated armature 3 of relay 4C0 in unit 4U2 to reverse-bias the varistor 4D. When scanning is resumed, the line 4L04 does not initiate a service request when it is connected to one of the trunks 5T0–9. The scanning pulse from counter 1VF is then directed through capacitor 4VF, varistor 4D, capacitor 4C, the operated armature 3 of relay 4C0, and varistor 4M1 to the amplifier 1LB.

At the central office, the converted mark pulses are provided through the amplifier 2LBL, the open gate 5LBT to the input terminal 1 of the flip-flop circuit 5LB. When the flip-flop circuit 5LB is set, it causes the operation of the line busy relay 7LB which provides the crosspoint closure indication to the marker 700 by completing a path from one of the leads LH to the hold magnet 5HM0 and removes the +100 volt potential from the tip lead of trunk 5T0. The line hold leads LH are multipled through the operated armatures 2 of the relays 7VF0–4. In the illustrative example, with line 4L04 initiating the service request, the ground potential is provided through the operated armature 2 of relay 7VF4, the operated armature 1 of relay 7LB, the operated armature 3 of relay 7TS0, the operated armature 9 of relay 6VG0, the operated armature 12 of relay 6H0 to the winding of the hold magnet 5HM0 which is connected to the battery 5B1. When the marker 700 receives the crosspoint closure indication, it supplies a ground potential through the line hold leads LH to operate the hold magnet 5HM0. When the hold magnet 5HM0 operates, it closes a connection between the trunk 5T0 and the bottom, or tenth, horizontal of the crossbar switch 5CR0. When the hold magnet 5HM0 operates, it also opens the path to the +100 volt connect potential, through its normal armature 2 from the tip ring of the trunk 5T0, and closes the operating path for relay 5SR0. The +100 volt path is already open at armature 2 of relay 7LB. Relay 5SR0, which operates as a memory that trunk 5T0 is in use, must be released when the call is terminated.

The operating path for the hold magnet 5HM0, as described above, is from armature 1 of relay 7LB through armature 3 of relay 7TS0. When the operated trunk selection relay is not relay 7TS0, the operating path for magnet 5HM0 also includes an armature of relay 7TSK. The operation of relay 7TSK indicates that only one of the relays 7TS0-5 is operated.

When the marker 700 has operated the hold magnet 5HM0 and completed a connection from the calling line 4L04 through trunk 5T0 and switch 5CR0 to an originating call register, now shown, it initiates the release of the connector 701. When the connector 701 releases it in turn allows the relays 6H0, 6VG0, 7D and 7VF4 to release. When relays 6H0 and 6VG0 release, they in turn cause the release of relay 7TS0 and open the signal path through lead 802 to circuit 801. When the relay 7TS0 releases it in turn causes the release of the relay 7TSK. When relay 7TSK releases it closes the gate 5LBT, resets the flip-flop circuit 5LB and restarts the generator 2PG. The battery 7B6 is connected, upon the release of relay 7TSK, to reset the flip-flop circuit 5LB, to reset the flip-flop circuit 2HGT0, and to restart the normal scanning of the pulse generator 2PG. Relay 7LB is released when circuit 5LB is reset, and relay 2HG0 is released when circuit 2HGT0 is reset. When relay 2HG0 releases, it in turn releases relays 3VFT4 and 3VGT0.

When the source 2PG is restarted it first supplies a reset pulse to the line concentrator and to register 300. The amplifier 1RS, which receives the reset pulse in the concentrator 110, is connected, as described above, to the circuit 1M. The reset pulse is supplied through the amplifier 1RS, the capacitor 1C2 and varistor 1D7 to the reset terminal 3 of the flip-flop circuit 1M, causing it to reset. When circuit 1M resets, it releases relay 1MR, which, in turn, releases relays 1VF4 and 1VG0. Relay 4C0, however, remains operated due to the locking path through its operated armature 4. The locking path is from battery 4B4, through resistor 4L1, varistor 4RV, the operated armature 4 of relay 4C0, the winding of relay 4C0, and resistor 4CT1 to ground.

As described above, when the hold magnet 5HM0 is operated the +100 volt connect potential is removed from the tip lead of the selected trunk 5T0. With the connect potential removed, tube 4CT extinguishes but relay 4C0 remains operated over the locking path to battery 4B4.

The normal scanning cycle continues until another service request is made by one of the lines 4L00-59, or a call is made thereto. Normal scanning continues during call back and disconnect. Call back is a sequence of operation for establishing a connection to an outgoing trunk which occurs after dialing is completed. The call-back sequence of operation is described in the above-identified disclosure of Joel-Krom-Posin. Briefly, the originating register, not shown, which receives the dial pulses, calls in the marker 700. The marker 700 releases switch 5CR0 and then establishes a connection through switch 5CR0 from trunk 5T0 to an outgoing trunk, not shown. The connection from the calling line 4L04 to trunk 5T0 remains locked during call back. Since the same trunk 5T0 is utilized for call back, the observation operator can continue the observation through the call-back sequence.

When the subscriber at substation 4S04 hangs up, the opening of line 4L04 is detected at the central office, and magnet 5HM0 is released. When the magnet 5HM0 releases, a −130 volt disconnect potential is applied to the tip lead of the trunk 5T0 and the slow release relay 5SR0 is released. The disconnect potential is provided from battery 6BD through the normal armature 11 of relay 6H0, the still operated armature 2 of slow release relay 5SR0, the normal armature 2 of relay magnet 5HM0, the tip lead of trunk 5T0, resistor 4R5, and varistor 4D2 to the cathode of tube 4DT. The anode of tube 4DT is connected through resistor 4L1 to battery 4B4 so that tube 4DT ionizes. When tube 4DT ionizes, its anode potential becomes more negative, and reverse-biases the varistor 4RV to open the locking path for relay 4C0. When relay 4C0 releases, it disconnects line 4L04 from trunk 5T0. When relay 5SR0 finally releases, the disconnect potential is removed from the tip lead of trunk 5T0. During the disconnect sequence the normal scanning cycle is continued. The observation operator may remain on trunk 8T if so desired through the conversation interval and disconnect as well as call back if so desired. The entire call from start to finish may in this manner be observed.

*Routine observation on a predetermined trunk*

For routine observation of one of the trunks 5T0-9 of one of the concentrators 110-19, the service observation control 810 is set to select the concentrator and the trunk connected to the concentrator and the switches 501 and 502 are operated to connect the trunk 8T to the concentrator trunk. If, for example, the observed trunk is trunk 5T0 of concentrator 110, the selector switches 8A-I are set at the 0 terminal and the switch 8HG is set at the 0 terminal. The line selector switches 8VF and 8VG are not utilized, and the switches 502 and 501 are set to connect trunk 8T to trunk 5T0. With the service observing control 810 set, in this manner, whenever the trunk 5T0 is selected for a call originating at any one of the lines 4L00-59, an observation indication is provided through lead 802 to the service observing circuit 801. For example, when a call is originated at the line 4L05, relays 2HG0, 3VFT0 and 3VGT1 are operated to register the calling line identity. For the vertical group 1, as indicated in Fig. 10, the six trunks 5T4, 5T7, 5T3, 5T0, 5T8 and 5T9 are connectable to the calling line 4L05. When any one of the relays 7TS0-5 is operated during the trunk selecting sequence of operations, its operation indicates the selection of one of the six trunks. When the trunk 5T0 is selected a signaling path is completed through the selector switches 8A-I to the service observing circuit 801. The wiring between the selector switches 8A-I and the right armatures of relays 3VGT0-11 includes essentially the trunk multiplying information. For line 4L05, trunk 5T0 is selected as a fourth preference, that is, trunk 5T0 is selected only if trunks 5T4, 5T7 and 5T3 are busy. With trunks 5T4, 5T7 and 5T3 busy, relays 7TS0, 7TS1 and 7TS2 are not operated during the trunk selection sequence of operations. Relays 7TS3, 7TS4 and 7TS5, however, operate. The relay 7TS3 is locked operated and relays 7TS4 and 7TS5 release. As described above, with only one of the relays 7TS0-5 operated, the relay 7TSK is operated. When relay 7TSK operates, it connects resistor 7S0 through its operated armature 0, the operated armature 0 of relay 7TS3, the armature of switch 8G, contact 0 of switch 8G, the lead 1 through cable 8C1, the right operated armature of relay 3VGT1, the operated armature 3 of relay 2HG0, the terminal 0 of switch 8HG, the armature of switch 8HG, lead 802 and the ring lead of trunk 8T to the service observing circuit 801. It is only when trunk 5T0 is selected for line 4L05 that a service observation signal is provided to the service observing circuit 801. The armature 0 of relay 7TSK is included in the observation signal path to avoid the provision of a false observation signal when the relays 7TS0–5 are first operated. It is only when one of the relays 7TS0–5 remains operated that a trunk has been selected.

Changing the setting of the switches 8A–I changes the trunk identity for which a signal is provided to the circuit 801. For example, if the switches 8A–I were set at terminal 3, a signal is provided to the service observing circuit 801, for a call which originates at line 4L05, when the trunk select relay 7TS2 operates since trunk 5T3 is the third preferred trunk. With switches 8A–I at terminal 0, the selection of trunk 5T0 for a call originating at any of the lines 4L00–59 initiates the signal to the circuit 801. For example, when a call originates at line 4L50 and relay 7TS2 is operated to select trunk 5T0, a path is provided from resistor 7S0 through the serially connected operated armature 0 of relays 7TSK and 7TS2, the armature of switch 8F, terminal 0 of switch 8F, lead 10 through cable 8C1, the operated right armature of relay 3VGT10, the operated armature 3 of relay 2HG0, cable 8C3, terminal 0 of switch 8HG, the armature of switch 8HG, lead 802 and the ring lead of trunk 8T to the circuit 801.

By utilizing the trunk service observation facilities, the service provided by a concentrator trunk may, in this manner, be accurately determined.

*Complaint observation*

For a complaint observation it is advisable to observe all calls originated at the subscriber line and not just those for which the preferred trunk is utilized. The preferred trunk must be utilized for routine observation in order for a signal to be provided to the observation operator. The routine observation switches 501 and 502 are relatively quite simple because only a sampling from the observed line is required. When, however, all calls originating at a subscriber line are to be observed, as for a complaint observation, the switches 501 and 502 are modified in accordance with Fig. 13. The switch 1300 shown in Fig. 13 replaces switches 501 and 502. For complaint observation, the switch 1300 functions to connect the trunk 8T to any one of the trunks 5T0–9 that is selected for the observed line. An indication is provided to the observation operator independent of which trunk is selected and, in fact, even independent of the availability of any of the six trunks in the trunk multiple connected to the line. The service control 810 is set, as described above, for the routine observation. The switches 8VF and 8VG are set to identify the observed line; the switch 8HG is set to identify the concentrator; and the switches 8A–I are set at terminal L. When the observed line is line 4L04, of concentrator 110, switch 8VF is set at terminal 4 and switches 8VG and 8HG are set at terminal 0. In addition to these switches a complaint observation switch 8C0 is operated to provide a connection from the grounded resistor 8R2 to the armature of switch 8A. The switch 8C0 effectively short-circuits the armature 0 of the relay 7TS0 which is utilized for routine observation.

When a service request is received from line 4L04 and relays 2HG0, 3VGT0 and 3VFT4 have been operated, the observation signal is provided to the circuit 801. The grounded resistor 8R2 is connected through switch 8C0, the armature of switch 8A, terminal L of switch 8A, the right operated armature of relay 3VFT4, cable 8C2, terminal 4 of switch 8VF, the armatures of switches 8VF and 8VG, terminal 0 of switch 8VG, cable 8C1, the right operated armature of relay 3VGT0, the operated armature 3 of relay 2HG0, cable 8C3, the armature of switch 8HG, terminal 0 of switch 8HG, lead 802 and the ring lead of trunk 8T to the observation circuit 801. The observation signal is provided, in this manner, when the service request pulse is received from the concentrator 110 before the initiation of the trunk selecting sequence of operation.

Figure 13:
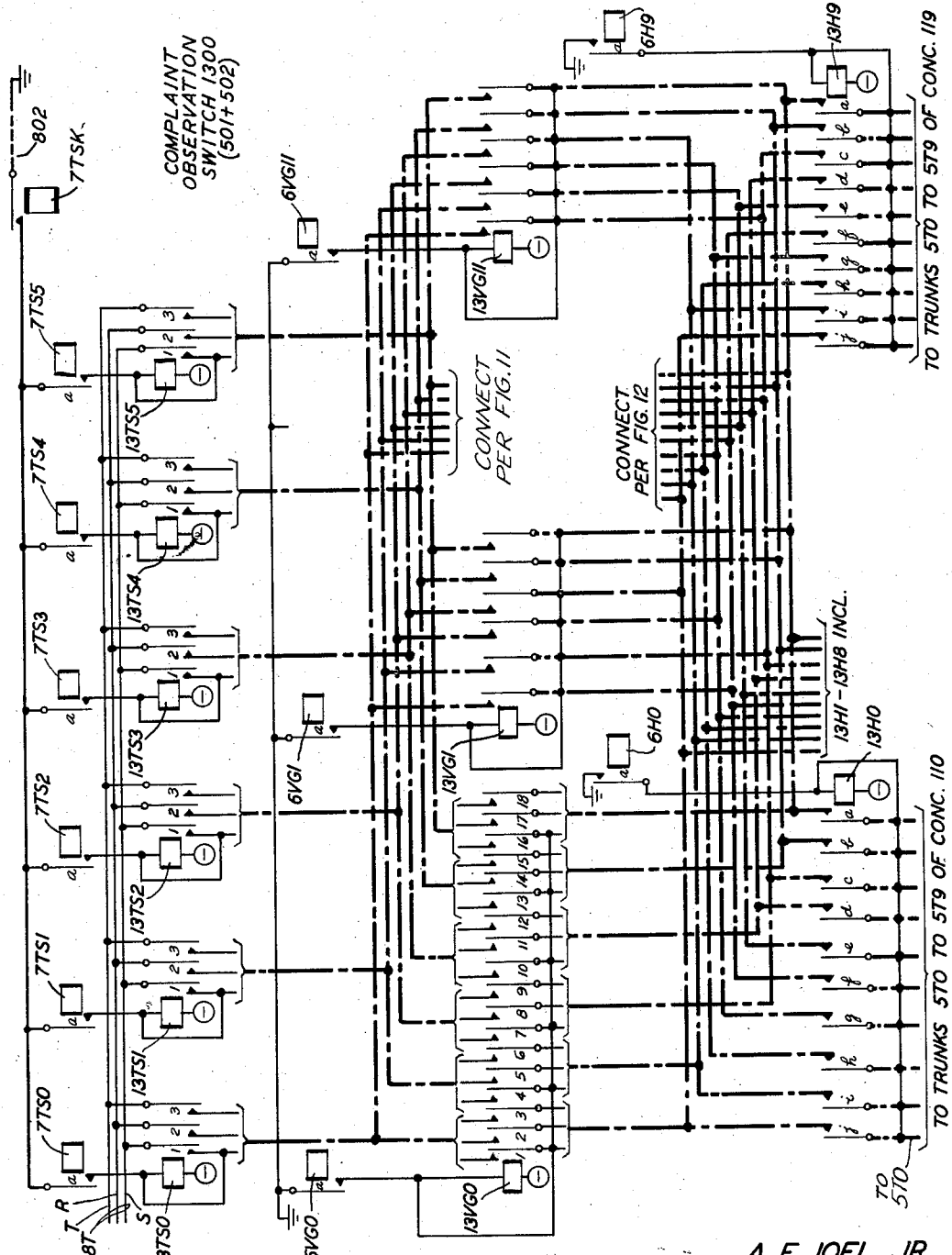
Fig. 13 is a circuit representation of the switching circuit which is utilized for complaint observation.

When the marker 700 seizes the line link connector 701 and operates relays 6VG0 and 6H0, operating paths are provided through their armatures A, respectively, for the relays 13VG0 and 13H0. The armatures A of relays 6VG0 and 6H0 are shown in Fig. 13. When one of the trunk selecting relays 7TS0–5 is operated to select one of the six trunks connectable to the calling line 4L04, it operates an associated one of the relays 13TS0–5. For example, when relay 7TS0 operates, a connection is provided from the grounded resistor 8R2 through the observation signal path to lead 802 and then through the operated armature A of relay 7TSK and the operated armature A of relay 7TS0 to the winding of relay 13TS0. The lead 802 is connected through the operated armature A of relay 7TSK to the armature A of each of the relays 7TS0–5. Relay 13TS0 is operated only if the signal path to the circuit 801 is complete and the signal path is complete when a call is originated at the observed line 4L04.

As shown in Fig. 13, with relays 13TS0, 13VG0 and 13H0 operated, the trunk 8T is connected to the trunk 5T0. A locking path is provided for each of the relays 13TS0, 13VG0 and 13H0 to the sleeve lead of the trunk 8T. Ground is provided on the sleeve lead of trunk 5T0 when the dialing connection is established. As long as a ground potential is on the sleeve lead of trunk 8T, all three relays 13TS0, 13VG0 and 13H0 remain operated and the connection between trunks 8T and 5T0 remains established.

The relays 13TS0–5, 13HG0–9 and 13VG0–11 are slow release relays which remain operated during call back. The same trunk 5T0, which was utilized for the dialing connection, is utilized for the call-back connection. When the call-back connection is established the sleeve ground is reapplied to maintain the relays 13VG0, 13HG0 and 13TS0 operated.

The above-described arrangements are illustrative of the principles of this invention. For example, all three types of service observation may be provided in one embodiment of this invention. Routine, trunk and complaint observation facilities may be provided in one embodiment by utilizing both the switches 501 and 502 and the switch 1300: one simple switch 501 for the routine and trunk observation of each concentrator and one automatic switch 1300 for the complaint observation of all ten concentrators. A manual switch, not shown, would be provided to select one or the other of the switches 501 or 1300 by connecting trunk 8T thereto. It is evident, therefore, that numerous arrangements may be devised by those skilled in the art without departing from the spirit and scope of the invention.

What is claimed is:

1. In a line concentrator telephone system having many subscriber lines and few trunks, an observation circuit, means for discriminating between originating calls and terminating calls, means for selecting the line to be observed, means for establishing a trunk preference for each of said lines, and means controlled jointly by said discriminating means and said selecting means and said preference establishing means for providing a signal to said observation circuit whenever a call is originated at said selected line and the preferred one of said trunks is utilized.

2. In a line concentrator telephone system having many subscriber lines and few trunks, an observation circuit, means for discriminating between originating calls and terminating calls, means for selecting the line to be observed, means for selecting one of said trunks for extending a connection from said line to be observed, and means controlled jointly by said discriminating means and said trunk selecting means for providing a signal to said observation circuit whenever said selected trunk is utilized for an originating call.

3. A telephone system comprising a central office, a large plurality of subscriber lines, a small plurality of talking trunks, a line concentrator for establishing connections from said lines to said trunks, means at said concentrator effective upon the initiation of a calling condition on any one of said lines for supplying an indication of said calling line to said central office, means at said central office for establishing a preference of said trunks for each of said lines, means at said central office controlled by preference establishing means and responsive to said indication for selecting the preferred idle one of said trunks for said calling line, a service observation circuit, and means controlled by said trunk selecting means for connecting said observation circuit at said central office to said selected trunk.

4. In combination with a plurality of subscriber lines terminating at a line concentrator which is connected by a plurality of talking trunks to a telephone central office, means at said central office for selecting one of said trunks, means at said line concentrator and controlled by said selecting means for establishing a line-to-trunk connection, a service observing circuit at said central office and connected at said central office to any one of said trunks, means at said central office and controlled by said selecting means upon the selection of the one of said trunks that is connected to said service observing circuit for supplying an alerting signal to said observing circuit.

5. In a telephone system, a central office, a group of subscriber lines, a plurality of trunks extending from said central office and being less in number than said group of subscriber lines, a switch serving said subscriber lines and located at a distance from said central office for establishing connections from said lines to said trunks, means associated with said switch for operating said switch, means in said central office for selecting an idle one of said trunks that is connectable to any one of said lines and for controlling said switch operating means in accordance with the trunk selection, and means at said central office effective upon the origination of a call at a predetermined one of said lines and controlled by said selecting and controlling means for establishing a bridging connection at said central office to said selected trunk before the operation of said switch operating means.

6. In a telephone system, a central office, a remote line concentrator, a plurality of subscriber lines terminating at said concentrator, a plurality of trunks less in number than said plurality of lines for connecting said concentrator with said central office, a crosspoint network at said concentrator for connecting said lines to said trunks on a slip-multiple basis, means at said central office for identifying said trunks in any one of the multiples, means at said central office controlled by said identifying means for establishing a preference of selection of said identified trunks, means at said central office controlled by said preference establishing means for selecting the preferred idle one of said identified trunks, and means effective when a call is originated at a predetermined one of said lines and controlled by said selecting means when the preferred trunk in the multiple connected to said predetermined line is selected for providing a bridging connection at said central office to said preferred and selected trunk.

7. In a telephone system, a central office; a plurality of groups of lines; a crosspoint network for each of said groups of lines, each of said networks providing a plurality of connections to each of said lines in said associated group of lines; a group of talking trunks extending from said central office for each of said networks, the number of trunks in each of said groups being greater than the number of connections to each of said lines; a service observing circuit at said central office comprising means for preselecting any one of said networks, means for preselecting any one of said lines, a service observing signaling path, a service observing trunk, and means for connecting said observing trunk at said central office to any one of said talking trunks; means associated with each of said networks and responsive to the initiation of a call on any one of said associated lines for supplying an identification of said line to said central office; means at said central office for determining the identity of said network associated with said calling line and for registering the identity of said network and the identity of said calling line; means in said central office controlled by said determining and registering means for determining which of said trunks are connectable to said calling line; means controlled by said trunk determining means for selecting an idle one of said trunks that are connectable to said calling line; matching means controlled by said network preselecting means and by said line preselecting means and also by said determining and registering means for readying said signaling path; means effective upon the selection of the one of said trunks that is connected to said observing trunk by said observation trunk connecting means for supplying an alerting signal over said readied path; and means controlled by said trunk selecting means for operating said network associated with said calling line to connect said calling line to said selected trunk.

8. In a telephone system, a central office; a plurality of groups of lines; a crosspoint network for each of said groups of lines, each of said networks providing a plurality of connections to each of said lines in said associated group of lines; a group of talking trunks extending from said central office for each of said networks, the number of trunks in each of said groups being greater than the number of connections to each of said lines; a service observing circuit at said central office comprising means for selecting any one of said networks, means for selecting any one of said lines, a service observing signaling path, a service observing trunk, and means for connecting said observing trunk at said central office to any one of said talking trunks; means associated with each of said networks and responsive to the initiation of a call on any one of said associated lines for supplying an identification of said line to said central office; means at said central office for determining the identity of said network associated with said calling line and for registering the identity of said calling line; means in said central office controlled by said determining and registering means for determining which of said trunks are connectable to said calling line; means controlled by said trunk determining means for selecting an idle one of said trunks that are connectable to said calling line; matching means controlled by said network selecting means and by said line selecting means and also by said determining and registering means for supplying an alerting signal over said signaling path; means controlled by said trunk selecting means for operating said observing trunk connect means to connect said observing trunk to said selected trunk; and means controlled by said trunk selecting means for operating said network associated with said calling line to connect said calling line to said selected trunk.

9. In a switching system, a central switching station, an auxiliary switching station, a plurality of lines extending from said auxiliary switching station, each of said lines having two electrical conditions, a plurality of trunks less in number than said plurality of lines and being arranged in overlapping groups of trunks, said lines being connectable to said groups on a slip-multiple basis, means at said auxiliary switching station for determining which one of said groups is connectable to any one of said lines, means at said central switching station for determining which one of said groups is connectable to any one of said lines, means responsive to a change in condition on any one of said lines for initiating the operation of said auxiliary station determining means and of said central station determining means, a service observing circuit at said central station, means controlled by said central station determining means for selecting an idle one of said trunks, means controlled by said trunk selecting means for connecting said service observing circuit at said central station to said selected trunk, and means including said auxiliary station determining means and controlled by said trunk selecting means for establishing a connection from said changed condition line to said central station.

10. In a switching system in accordance with claim 9 in addition a preselector at said central station for registering the identity of any one of said lines, and means at said central station effective when a call is originated at said identity registered line for supplying an alerting signal to said observation circuit.

11. In a telephone system, a central office, a plurality of remotely located line concentrators, a plurality of subscriber lines terminating at each of said concentrators, a plurality of trunks arranged in overlapping trunk multiples and connecting each of said concentrators with said central office, said plurality of trunks connected to any one of said concentrators being less in number than said plurality of lines terminating at each said one of said concentrators, a switching network at each of said concentrators for establishing connections from any one of said lines to any one of said trunks in an associated one of said trunk multiples, a control circuit at said central office for preselecting any one of said concentrators and any one of said lines terminating at said preselected concentrator, means at said central office for establishing a selecting preference for said trunks in each of said trunk multiples, and means controlled jointly by said control circuit and preference establishing means for providing a signal when a call is originated at said preselected line terminating at said preselected concentrator and when the preferred trunk for said preselected line is idle.

12. In a telephone system in accordance with claim 11 in addition scanning means at each of said concentrators for determining the service condition of said lines terminating thereat, means at each of said concentrators for supplying to said central office the identity of a service requesting one of said lines terminating thereat, means at said central office and controlled by said supply means for initiating the operation of said selecting preference means, means controlled by said preference establishing means for selecting the preferred idle one of said trunks in said trunk multiple associated with said service requesting line, and an observation circuit connected to the preferred one of said trunks in said trunk multiple associated with said preselected line.

13. In a telephone system, a central office, a plurality of remotely located line concentrators, a plurality of subscriber lines terminating at each of said concentrators, a plurality of trunks arranged in overlapping trunk multiples and connecting each of said concentrators with said central office, said plurality of trunks connected to any one of said concentrators being less in number than said plurality of lines terminating at each said one of said concentrators, a switching network at each of said concentrators for establishing connections from any one of said lines to any one of said trunks in an associated one of said trunk multiples, a control circuit at said central office for preselecting any one of said concentrators and any one of said trunks connected to said preselected concentrator, scanning means at each of said concentrators for determining the service condition of said lines terminating thereat, means at each of said concentrators for supplying to said central office the identity of a service requesting one of said lines terminating thereat, means at said central office for establishing a selecting preference for said trunks in each of said trunk multiples, means at said central office and controlled by said supply means for initiating the operation of said selecting preference means, means controlled by said preference establishing means for selecting the preferred idle one of said trunks in said trunk multiple associated with said service requesting line, an observation circuit connected by said control circuit to said preselected trunk, and means controlled by said selecting means whenever said preselected trunk is selected for supplying an alerting signal to said observation circuit.

14. In a telephone system, a central office, a plurality of remotely located line concentrators, a plurality of subscriber lines terminating at each of said concentrators, a plurality of trunks arranged in overlapping trunk multiples and connecting each of said concentrators with said central office, said plurality of trunks connected to any one of said concentrators being less in number than said plurality of lines terminating at each said one of said concentrators, a switching network at each of said concentrators for establishing connections from any one of said lines to any one of said trunks in an associated one of said trunk multiples, a control circuit at said central office for preselecting any one of said concentrators and any one of said lines terminating at said preselected concentrator, scanning means at each of said concentrators for determining the service condition of said lines terminating thereat, means at each of said concentrators for supplying the identity of a service requesting one of said lines terminating thereat to said central office, means at said central office for establishing a selecting preference for said trunks in each of said trunk multiples, means at said central office and controlled by said supply means for initiating the operation of said selecting preference means, means controlled by said preference establishing means for selecting the preferred idle one of said trunks in said trunk multiple associated with said service requesting line, an observation circuit, a switching circuit controlled by said selecting means for connecting said observation circuit to said selected trunk, and means jointly controlled by said control circuit and by said concentrator supply means for supplying an observation indication to said observation circuit when the service request is from said preselected line terminating at said preselected concentrator.

15. A telephone system comprising a central office, a large plurality of subscriber lines, a small plurality of talking trunks, a line concentrator for establishing connections from said lines to said trunks, means at said concentrator effective upon the initiation of a calling condition on any one of said lines for supplying an indication of said calling line to said central office, means at said central office and responsive to said calling line indication for selecting an idle one of said trunks, means at said central office and controlled by said selecting means for initiating the operation of said line concentrator to establish a connection from said calling line to said selected trunk, an observation circuit, and switching means controlled by said selecting means for connecting said observation circuit to said selected trunk at said central office before the establishment of the connection from said calling line to said selected trunk by said concentrator.

16. In a telephone system in accordance with claim 15 in addition means at said central office for preselecting one of said lines for observation, and means at said central office and responsive to said calling line indication for providing an observation indication to said observation circuit.

17. In a line concentrator telephone system having many subscriber lines and few trunks, an observation circuit, means associated with said observation circuit for selecting the line to be observed, means for establishing a trunk preference for each of said lines, and means controlled jointly by said selecting means and said preference establishing means for providing a signal to said observation circuit whenever the preferred one of said trunks is utilized for said selected line.

18. In a line concentrator telephone system having many subscriber lines and few trunks, an observation circuit, means for selecting the line to be observed, means for selecting one of said trunks for extending a connection from said line to be observed, and means controlled by said trunk selecting means for providing a signal to said observation circuit whenever said selected trunk is utilized.

19. A telephone system comprising a central office, a large plurality of subscriber lines, a small plurality of talking trunks, a line concentrator for establishing connections from said lines to said trunks, means at said central office for establishing a preference of said trunks for each of said lines, means at said central office controlled by preference establishing means for selecting the preferred idle one of said trunks for any one of said lines, a service observation circuit, and means controlled by said trunk selecting means for connecting said observation circuit at said central office to said selected trunk.

20. In a line concentrator telephone system having many subscriber lines and few trunks, an observation circuit, means associated with said observation circuit for selecting the line to be observed, means for establishing a trunk preference for each of said lines, and means controlled jointly by said selecting means and said preference establishing means for providing a signal to said observation circuit.

No references cited.